United States Patent
Choi et al.

(10) Patent No.: US 12,469,435 B2
(45) Date of Patent: Nov. 11, 2025

(54) DISPLAY APPARATUS WITH MOVEMENT-BASED TEXT INPUT

(71) Applicant: SAMSUNG DISPLAY CO., LTD., Yongin-si (KR)

(72) Inventors: Jaeuk Choi, Yongin-si (KR); Kiseo Kim, Yongin-si (KR); Hyunjae Lee, Yongin-si (KR); Junghak Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/646,556

(22) Filed: Apr. 25, 2024

(65) Prior Publication Data

US 2025/0095549 A1 Mar. 20, 2025

(30) Foreign Application Priority Data

Sep. 18, 2023 (KR) .................. 10-2023-0124087

(51) Int. Cl.
*G09G 3/32* (2016.01)
*G06F 3/04883* (2022.01)
*H01Q 1/24* (2006.01)

(52) U.S. Cl.
CPC .......... *G09G 3/32* (2013.01); *G06F 3/04883* (2013.01); *H01Q 1/243* (2013.01); *G09G 2310/0275* (2013.01); *G09G 2354/00* (2013.01)

(58) Field of Classification Search
CPC ............. G09G 3/32; G09G 2310/0275; G09G 2354/00; G06F 3/04883; H01Q 1/243
See application file for complete search history.

(56) References Cited

U.S. PATENT DOCUMENTS

| 10,948,996 | B2 | 3/2021 | Poupyrev et al. | |
|---|---|---|---|---|
| 2007/0063950 | A1* | 3/2007 | Shin | G11C 19/184 345/92 |
| 2012/0162040 | A1* | 6/2012 | Taura | H01Q 21/28 343/893 |
| 2013/0342450 | A1* | 12/2013 | Tetsuhashi | G06F 3/011 345/156 |
| 2014/0328084 | A1* | 11/2014 | Chuang | H01Q 1/243 361/767 |
| 2018/0124933 | A1* | 5/2018 | Park | H05K 13/04 |
| 2019/0138109 | A1 | 5/2019 | Poupyrev et al. | |
| 2020/0014911 | A1 | 1/2020 | Maier et al. | |

(Continued)

FOREIGN PATENT DOCUMENTS

| CN | 107168526 Y | 8/2005 |
|---|---|---|
| KR | 10-1777807 B1 | 9/2017 |

(Continued)

*Primary Examiner* — Stephen G Sherman
(74) *Attorney, Agent, or Firm* — CHAU & ASSOCIATES, LLC

(57) ABSTRACT

A display apparatus capable of detecting movement of an object and displaying text corresponding to the detected movement is provided. The display apparatus includes a substrate including a display area and a peripheral area proximate to the display area. A plurality of pixels are arranged in the display area. A first antenna is arranged in the peripheral area and extends in a first direction. A second antenna is arranged in the peripheral area and extends in a second direction crossing the first direction.

20 Claims, 18 Drawing Sheets

(56) References Cited

U.S. PATENT DOCUMENTS

| | | | |
|---|---|---|---|
| 2020/0057504 A1* | 2/2020 | Lien | G01S 13/874 |
| 2020/0201470 A1* | 6/2020 | Oh | H01Q 1/44 |
| 2021/0263606 A1* | 8/2021 | Lee | G06F 3/0445 |
| 2024/0055751 A1 | 2/2024 | Kim et al. | |

FOREIGN PATENT DOCUMENTS

| | | | | |
|---|---|---|---|---|
| KR | 1992588 B1 | 6/2019 | | |
| KR | 10-2024-0023338 A | 2/2024 | | |
| WO | WO-2023286815 A1 * | 1/2023 | | H01L 27/1214 |

\* cited by examiner

DISL: TETL, EML

DISPLAY APPARATUS WITH MOVEMENT-BASED TEXT INPUT

CROSS-REFERENCE TO RELATED APPLICATION

This application claims priority under 35 U.S.C. § 119 to Korean Patent Application No. 10-2023-0124087, filed on Sep. 18, 2023, in the Korean Intellectual Property Office, the disclosure of which is incorporated by reference herein in its entirety.

TECHNICAL FIELD

The present disclosure relates to a display apparatus, and more particularly, to a display apparatus capable of detecting movement of an object and displaying text corresponding to the detected movement.

DISCUSSION OF THE RELATED ART

In general, a display apparatus may display various images using pixels arranged in a display area thereof. Display apparatuses may have various form factors and may include, for example, smartphones, digital cameras, laptop computers, navigation apparatuses, and smart televisions.

SUMMARY

A display apparatus includes a substrate including a display area and a peripheral area proximate to the display area. A plurality of pixels are disposed in the display area. A first antenna is disposed in the peripheral area and extends in a first direction. A second antenna is disposed in the peripheral area and extends in a second direction crossing the first direction.

The display apparatus may further include a data driving circuit disposed in the peripheral area and configured to output data signals to the plurality of pixels.

The display apparatus may further include an antenna driving circuit disposed in the peripheral area, the antenna driving circuit configured to transmit, to the first antenna and the second antenna, signals regarding electromagnetic waves to be radiated from the first antenna and the second antenna, or process electromagnetic signals received by the first antenna and the second antenna.

The data driving circuit may be disposed in a first portion of the peripheral area, and the antenna driving circuit may be disposed in a second portion of the peripheral area.

The display area may be disposed between the first portion and the second portion.

The display apparatus may further include a plurality of first pads disposed in a first portion of the peripheral area and electrically connected to the data driving circuit, and a plurality of second pads disposed in a second portion of the peripheral area and electrically connected to the first antenna or the second antenna.

The display area may be disposed between the first portion and the second portion.

The display apparatus may further include a display printed circuit board electrically connected to the plurality of first pads, and an antenna printed circuit board electrically connected to the plurality of second pads.

The display apparatus may further include an antenna driving circuit disposed on the antenna printed circuit board, the antenna driving circuit configured to transmit, to the first antenna and the second antenna, signals regarding electromagnetic waves to be radiated from the first antenna and the second antenna, or process electromagnetic signals received by the first antenna and the second antenna.

The display apparatus may further include a main circuit board electrically connected to the display printed circuit board and the antenna printed circuit board.

The display apparatus may further include an antenna driving circuit disposed on the main circuit board, the antenna driving circuit configured to transmit, to the first antenna and the second antenna, signals regarding electromagnetic waves to be radiated from the first antenna and the second antenna, or process electromagnetic signals received by the first antenna and the second antenna.

The display apparatus may further include a dam disposed in the peripheral area and surrounding the display area, wherein the first antenna and the second antenna may be disposed between the dam and an edge of the substrate.

The display apparatus may be configured to detect a movement of an object through the first antenna and the second antenna and may be further configured to display text corresponding to the detected movement of the object through the plurality of pixels.

The movement of the object may be a hand movement based on a sign language.

A display apparatus includes display area including a pair of first sides extending in a first direction and a pair of second sides extending in a second direction crossing the first direction. A non-display area (also referred to as "a peripheral area") at least partially surrounds the display area and includes a pair of first sides extending in the first direction and corresponding to the pair of first sides of the display area, and a pair of second sides extending in the second direction and corresponding to the pair of second sides of the display area. A first antenna extends in the second direction from one of the first sides of the pair of first sides of the non-display area. A second antenna extends in the first direction from one of the second sides of the pair of second sides of the non-display area. Each of the first antenna and the second antenna are configured to detect movement of an object proximate to the display apparatus and communicate the detected movement to a driving circuit that is configured to interpret the movement into text.

The driving circuit may be disposed in the non-display area.

A plurality of first pads may be disposed in the non-display area and may be electrically connected to the driving circuit and a plurality of second pads may be disposed in the non-display area and may be electrically connected to the first and/or the second antennas.

The display apparatus may further include a display printed circuit board electrically connected to the plurality of first pads and an antenna printed circuit board electrically connected to the plurality of second pads.

The display area may be configured to display the text interpreted by the driving circuit.

The driving circuit may be configured to interpret movement that conforms to a sign language hand gesture.

BRIEF DESCRIPTION OF THE DRAWINGS

The above and other aspects and features of embodiments of the present disclosure will be more apparent from the following description taken in conjunction with the accompanying drawings, in which.

DETAILED DESCRIPTION

Figure 1:
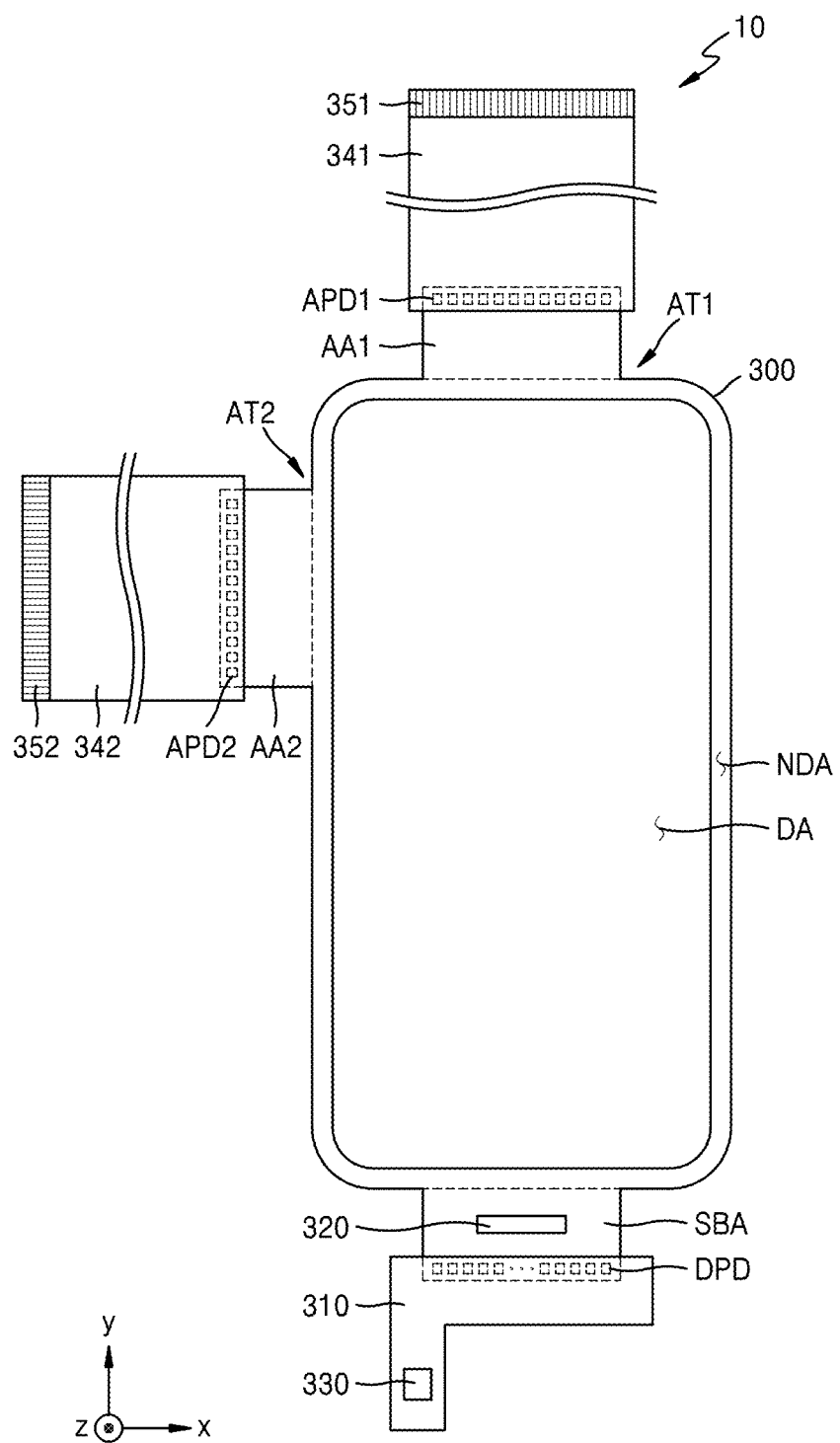
FIG. 1 is a schematic plan view illustrating a portion of a display apparatus according to an embodiment.

Reference will now be made in detail to embodiments, examples of which are illustrated in the accompanying drawings, wherein like reference numerals may refer to like elements throughout the specification and the drawings. In this regard, the present embodiments may have different forms and should not necessarily be construed as being limited to the descriptions set forth herein. As used herein, the term "and/or" includes any and all combinations of one or more of the associated listed items.

Because various modifications may be applied and one or more embodiments may be implemented, specific embodiments will be shown in the drawings and described in detail in the detailed description. Effects and features, and methods for achieving them will be clarified with reference to embodiments described below in detail with reference to the drawings. However, the embodiments may have different forms and should not necessarily be construed as being limited to the descriptions set forth herein.

Hereinafter, the embodiments will now be described in detail with reference to the accompanying drawings. When described with reference to the drawings, identical or corresponding elements may be given the same reference numerals, and to the extent that an element is not described in detail with respect to this figure, it may be understood that the element is at least similar to a corresponding element that has been described elsewhere within the present disclosure.

In the following embodiments, it will be understood that when an element, such as a layer, film, region, or plate, is referred to as being "on" another element, the element may be directly on the other element or indirectly on the other element with intervening elements therebetween. While each drawing may represent one or more particular embodiments of the present disclosure, drawn to scale, such that the relative lengths, thicknesses, and angles can be inferred therefrom, it is to be understood that the present invention is not necessarily limited to the relative lengths, thicknesses, and angles shown. Changes to these values may be made within the spirit and scope of the present disclosure, for example, to allow for manufacturing limitations and the like.

In the following embodiments, the x-axis, the y-axis, and the z-axis are not necessarily limited to three axes of the rectangular coordinate system, and may be interpreted in a broader sense. For example, the x-axis, y-axis, and z-axis may be orthogonal to each other, but may refer to different directions that are not orthogonal to each other.

It will be understood that although terms "first" and "second" may be used herein to describe various elements, these elements should not necessarily be limited by these terms and these terms are used to distinguish one element from another.

It will be understood that terms "comprise," "include," and "have" used herein specify the presence of stated features or elements, but do not preclude the presence or addition of one or more other features or elements.

In the present specification, the expression "A and/or B" indicates A, B, or A and B. Also, the expression such as "at least one of A and B" indicates A, B, or A and B.

In the following embodiments, it will be understood that when a layer, region, or element is referred to as being "connected to" or "coupled to" another layer, region, or element, it may be directly or indirectly connected or coupled to the other layer, region, or element. For example, intervening layers, regions, or elements may be present. For example, as used herein, when a layer, region, or element is referred to as being electrically connected to another element, it may be directly electrically connected to the other layer, region, or element or indirectly electrically connected to the other layer, region, or element via intervening layers, regions, or elements.

Figure 2:
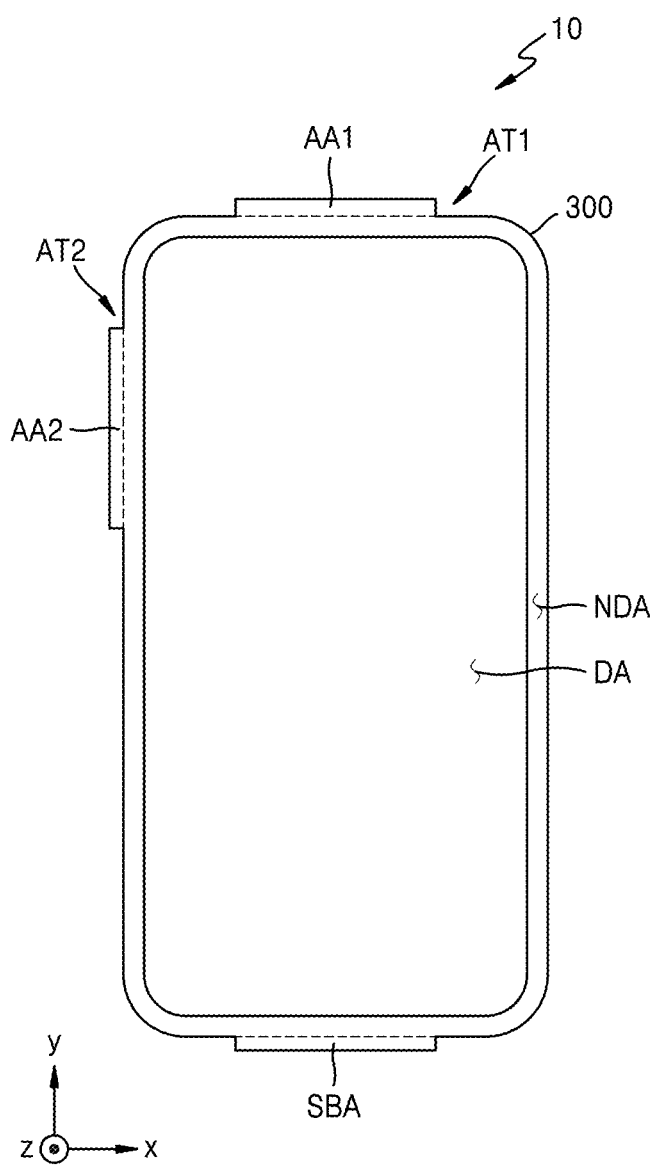
FIG. 2 is a schematic plan view illustrating a bent portion of the display apparatus of FIG. 1.

FIG. 1 is a schematic plan view illustrating a portion of a display apparatus 10 according to an embodiment, and FIG. 2 is a schematic plan view illustrating a bent portion of the display apparatus 10 of FIG. 1.

The display apparatus 10, according to the present embodiment, may include a portable electronic apparatus such as a mobile phone, a smartphone, a tablet personal computer (PC), a mobile communication terminal, an electronic notebook, an electronic book, a portable multimedia player (PMP), a navigation apparatus, or an ultra-mobile PC (UMPC). Alternatively, the display apparatus 10, according to the present embodiment, may include a television, a laptop computer, a computer monitor, a digital billboard, or an Internet of things (IoT) apparatus. Alternatively, the display apparatus 10, according to the present embodiment, may include a wearable apparatus such as a smart watch, a watch phone, a glasses-type display, or a head-mounted display (HMD). Alternatively, the display apparatus 10, according to the present embodiment, may include a center information display (CID) apparatus arranged on an instrument panel of a vehicle, a center fascia of a vehicle, or a dashboard of a vehicle, a room mirror display apparatus functioning in place of a side mirror of a vehicle, or a display apparatus arranged on the back of a front seat as an entertainment apparatus for back seat passengers of a vehicle.

The display apparatus 10 may include a substrate SUB (see FIG. 3, etc.), and the substrate SUB may include a display area DA and a peripheral area NDA at least partially surrounding the display area DA. The display area DA may have a circular, oval, or substantially rectangular shape. FIG. 1 shows a case in which the display area DA has a substantially rectangular shape having a pair of long sides and a pair of short sides. A first direction (x-axis direction) may be a direction of the pair of short sides of the display apparatus 10, for example, a horizontal direction of the display apparatus 10. A second direction (y-axis direction) may be a direction of the pair of long sides of the display apparatus 10, for example, a vertical direction of the display apparatus 10. A third direction (z-axis direction) may be a thickness direction of the display apparatus 10. Corners where the short sides in the first direction (x-axis direction) meet the long sides in the second direction (y-axis direction) may be round to have a certain curvature or may alternatively be formed at right angles.

The display apparatus 10, according to the present embodiment, may include a display panel 300, a display printed circuit board (a display PCB) 310, a data driving circuit 320, a touch driving circuit 330, a first antenna printed circuit board (a first antenna PCB) 341, a second antenna printed circuit board (a second antenna PCB) 342, a first connector 351, and a second connector 352.

The display panel 300 may include a light-emitting display panel including a light-emitting element. For example, the display panel 300 may include an organic light-emitting display panel using an organic light-emitting diode (OLED) including an organic emission layer, a micro light-emitting diode (LED) display panel using a micro LED, a quantum dot light-emitting display panel using a quantum dot LED including a quantum dot layer, or an inorganic light-emitting display panel using an inorganic LED including an inorganic semiconductor.

The display panel 300 may include a flexible display panel that is flexible and thus may be bendable, foldable, or rollable to a noticeable extent without cracking or otherwise sustaining damage. For example, the display panel 300 may include a foldable display panel that may be folded or unfolded, a curved display panel whose display surface is bent, a bended display panel in which areas other than a display surface are bent, a rollable display panel that may be rolled or unrolled, or a stretchable display panel that may be stretched.

The display panel 300 may include the display area DA and the peripheral area NDA at least partially surrounding the display area DA. It may be understood that a substrate SUB included in the display panel 300 includes the display area DA and the peripheral area NDA at least partially surrounding the display area DA. The peripheral area NDA may include a sub-area SBA, a first antenna area AA1, and a second antenna area AA2. The sub-area SBA may have a shape that protrudes downward (in a −y direction) from the display area DA, the first antenna area AA1 may have a shape that protrudes upward (in a +y direction) from the display area DA, and the second antenna area AA2 may have a shape that protrudes in a side direction (in a −x direction) from the display area DA.

A plurality of pixels may be arranged in the display area DA. The peripheral area NDA may be an area at least partially surrounding the display area DA. The peripheral area NDA may be defined as an edge area of the display panel 300. The peripheral area NDA may be interpreted as including the sub-area SBA, the first antenna area AA1, and the second antenna area AA2.

The sub-area SBA may protrude downward (in the −y direction) from the display area DA. As shown in FIG. 1, a length of the sub-area SBA in the first direction (x-axis direction) may be less than a length of the display area DA in the first direction (x-axis direction), and a length of the sub-area SBA in the second direction (y-axis direction) may be less than a length of the display area DA in the second direction (y-axis direction), but one or more embodiments are not necessarily limited thereto.

As shown in FIG. 2, the sub-area SBA may be bent such that at least a portion of the sub-area SBA may be located under the display panel 300. For example, when seen from the third direction (z-axis direction), the portion of the sub-area SBA may overlap the display area DA of the display panel 300 or overlap a portion of the peripheral area NDA adjacent to the display area DA.

Display pads DPD that may be referred to as first pads may be arranged at one edge of the sub-area SBA. The edge of the sub-area SBA may be a lower edge (in the −y direction) of the sub-area SBA. The display PCB 310 may be attached to the display pads DPD of the sub-area SBA. The display PCB 310 may be attached to the display pads DPD of the sub-area SBA via a conductive adhesive member (e.g., an adhesive) such as an anisotropic conductive film or anisotropic conductive paste. The display PCB 310 may include a flexible PCB (FPCB) that may be bent, a rigid PCB that is hard and thus is not easily bent, or a composite PCB including both a rigid PCB and an FPCB.

The data driving circuit 320 may be disposed on the sub-area SBA of the display panel 300. The data driving circuit 320 may receive control signals and power voltages, and generate and output signals and voltages for driving the display panel 300. The data driving circuit 320 may be an integrated circuit (IC).

The touch driving circuit 330 may be disposed on the display PCB 310. The touch driving circuit 330 may be an IC. The touch driving circuit 330 may be mounted on the display PCB 310.

The touch driving circuit 330 may be electrically connected to sensor electrodes of a sensor electrode layer of the display panel 300 through the display PCB 310. Accordingly, the touch driving circuit 330 may output a touch driving signal to each sensor electrode and detect a voltage charged in mutual capacitance of the sensor electrodes.

The sensor electrode layer of the display panel 300 may detect a touch. The touch refers to direct contact of an object, such as a finger of a person or an active/passive stylus/pen, to a cover window on the sensor electrode layer.

A power supplier is additionally provided on the display PCB 310 and may thus supply driving voltages for driving the pixels of the display panel 300 and the data driving circuit 320. Alternatively, the power supplier may be integrated with the data driving circuit 320, in which case the data driving circuit 320 and the power supplier may be formed as one IC.

A first antenna AT1 may be arranged in the first antenna area AA1. As described above, because the peripheral area NDA may be interpreted as including the sub-area SBA, the first antenna area AA1, and the second antenna area AA2, the first antenna AT1 may be understood as being arranged in the peripheral area NDA. The first antenna AT1 may have a shape extending in the first direction (x-axis direction). For example, the first antenna AT1 may include antenna modules arranged in the first direction (x-axis direction), as described below. As described below, an antenna module for wireless transmission or reception may include an antenna electrode, a feed line, and a ground electrode.

The first antenna area AA1 may protrude upward (in the +y direction) from the display area DA. As shown in FIG. 1, a length of the first antenna area AA1 in the first direction (x-axis direction) may be less than the length of the display area DA in the first direction (x-axis direction), and a length of the first antenna area AA1 in the second direction (y-axis direction) may be less than the length of the display area DA in the second direction (y-axis direction), but one or more embodiments are not necessarily limited thereto.

As shown in FIG. 2, the first antenna area AA1 may be bent and arranged under the display panel 300. In this case, when seen from the third direction (z-axis direction), the first antenna area AA1 may overlap the display area DA of the display panel 300 or overlap a portion of the peripheral area NDA adjacent to the display area DA.

First antenna pads APD1 that may be referred to as second pads may be arranged on one edge of the first antenna area AA1. The first antenna PCB 341 may be attached to the first antenna pads APD1 of the first antenna area AA1. The first antenna PCB 341 may be attached to the first antenna pads APD1 of the first antenna area AA1 by using a conductive adhesive member such as an anisotropic conductive film or anisotropic conductive paste. One side of the first antenna PCB 341 may include the first connector 351 electrically connected to a main circuit board on which an antenna driving circuit 360 (see FIG. 4) is mounted. The first antenna PCB 341 may be an FPCB that may be bent.

A second antenna AT2 may be arranged in the second antenna area AA2. As described above, because the peripheral area NDA may be interpreted as including the sub-area SBA, the first antenna area AA1, and the second antenna area AA2, the second antenna AT2 may be understood as being arranged in the peripheral area NDA. The second antenna AT2 may have a shape extending in the second direction (y-axis direction). For example, the second antenna AT2 may include antenna modules arranged in the second direction (y-axis direction).

The second antenna area AA2 may protrude in the first direction (x-axis direction) from one of edges extending in the second direction (y-axis direction) that connects the lower side and upper side of the display area DA. As shown in FIG. 1, a length of the second antenna area AA2 in the second direction (y-axis direction) may be less than the length of the display area DA in the second direction (y-axis direction), and a length of the second antenna area AA2 in the first direction (x-axis direction) may be less than the length of the display area DA in the first direction (x-axis direction), but one or more embodiments are not necessarily limited thereto.

Like the first antenna area AA1, the second antenna area AA2 may be bent and arranged under the display panel 300. In this case, when seen from the third direction (z-axis direction), the second antenna area AA2 may overlap the display area DA of the display panel 300 or overlap a portion of the peripheral area NDA adjacent to the display area DA.

Second antenna pads APD2 may be arranged on one edge of the second antenna area AA2. The second antenna PCB 342 may be attached to the second antenna pads APD2 of the second antenna area AA2. The second antenna PCB 342 may be attached to the second antenna pads APD2 of the second antenna area AA2 by using a conductive adhesive member such as an anisotropic conductive film or anisotropic conductive paste. One side of the second antenna PCB 342 may include the second connector 352 electrically connected to the main circuit board on which the antenna driving circuit 360 (see FIG. 4) is mounted. The second antenna PCB 342 may be an FPCB that may be bent.

Figure 3:
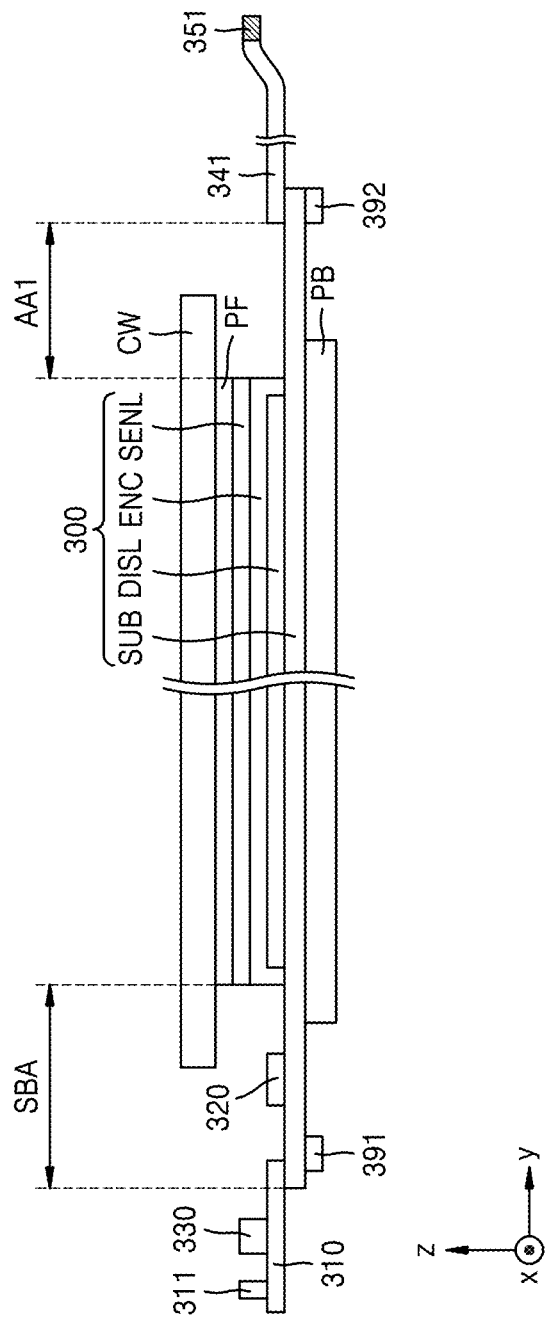
FIG. 3 is a schematic side conceptual diagram illustrating a portion of the display apparatus of FIG. 1.
Figure 4:
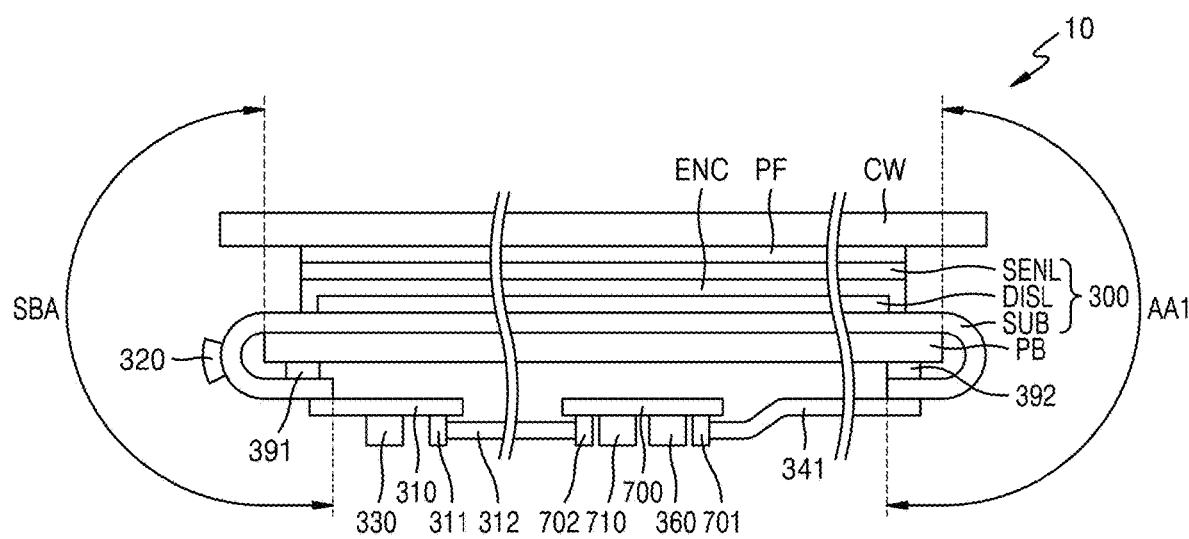
FIG. 4 is a schematic side conceptual diagram illustrating a bent portion of the display apparatus of FIG. 3.

FIG. 3 is a schematic side conceptual diagram of a portion of the display apparatus 10 of FIG. 1, and FIG. 4 is a schematic side conceptual diagram of a bent portion of the display apparatus 10 of FIG. 3.

The display apparatus 10, according to the present embodiment, may include a display panel 300, a polarizing film PF, a cover window CW, and a panel lower cover PB. The display panel 300 may include a substrate SUB, a display layer DISL, an encapsulation layer ENC, and a sensor electrode layer SENL.

The substrate SUB may include an insulating material such as a polymer resin. The substrate SUB may be a flexible substrate that is bendable, foldable, or rollable to a noticeable extent without cracking or otherwise sustaining damage.

The display layer DISL may be arranged in the display area DA of the substrate SUB. The display layer DISL may be a layer that includes emission areas and displays an image. The display layer DISL may include a thin-film transistor layer on which thin-film transistors are formed, and a light-emitting element layer on which light-emitting elements that emit light are arranged in emission areas.

In the display area DA of the display layer DISL, not only the emission areas but also scan lines, data lines, and power lines for driving the light-emitting elements of the emission areas may be arranged. In the peripheral area NDA of the display layer DISL, a scan driver that outputs scan signals to the scan lines, and a fan-out lines that connect the data lines to the data driving circuit 320 may be arranged.

The encapsulation layer ENC may be disposed on the display layer DISL. The encapsulation layer ENC may prevent oxygen or moisture from penetrating into the light-emitting element layer of the display layer DISL. The encapsulation layer ENC may be arranged on upper surface and side surfaces of the display layer DISL.

The sensor electrode layer SENL may be arranged above the display layer DISL, particularly, on the encapsulation layer ENC. The sensor electrode layer SENL may include sensor electrodes. The sensor electrode layer SENL may detect touch by using the sensor electrodes.

The polarizing film PF may be disposed on the sensor electrode layer SENL. The polarizing film PF may include a first base member (e.g., a first base), a linear polarizing plate, a phase retarder film such as a quarter-wave ($\lambda/4$) plate, and a second base member (e.g., a second base). The aforementioned components may be sequentially stacked on the sensor electrode layer SENL.

The cover window CW may be disposed on the polarizing film PF. The cover window CW may be attached to the polarizing film PF via a transparent adhesive member (e.g., a transparent adhesive) such as an optically clear adhesive (OCA) film.

The panel lower cover PB may be arranged under the display panel 300. The panel lower cover PB may be attached to the lower surface of the display panel 300 via an adhesive member. The adhesive member may include a pressure sensitive adhesive (PSA). The panel lower cover PB may include a light shielding member (e.g., a light shield) for absorbing ambient light, a buffer member (e.g., a buffer) for absorbing external shock, and/or a heat dissipation member (e.g., a heat dissipater) for efficiently dissipating heat from the display panel 300.

The light shielding member may be arranged under the display panel 300. The light shielding member blocks light transmission and prevents components arranged under the light shielding member, for example, the display PCB 310, from being visible from the top of the display panel 300. The light shielding member may include a light absorbing material such as a black pigment or black dye.

The buffer member may be arranged under the light shielding member. The buffer member may prevent damage to the display panel 300 by absorbing external shock. The buffer member may include a single layer or multiple layers (e.g., so as to have a multilayer structure). For example, the buffer member may include a polymer resin such as polyurethane, polycarbonate, polypropylene, or polyethylene.

The heat dissipation member may be arranged under the buffer member. The heat dissipation member may include a first heat dissipation layer including graphite or carbon nanotubes, and a second heat dissipation layer including a metal thin film, such as copper, nickel, ferrite, or silver, which may shield electromagnetic waves and has excellent thermal conductivity.

As shown in FIG. 4, the sub-area SBA of the substrate SUB may be bent, and accordingly, at least a portion of the sub-area SBA may be arranged under the panel lower cover PB. The sub-area SBA of the substrate SUB may be attached to the lower surface of the panel lower cover PB via a first adhesive member 391. The first adhesive member 391 may include a PSA.

Also, as shown in FIG. 4, the first antenna area AA1 of the substrate SUB may be bent, and accordingly, at least a portion of the first antenna area AA1 may be arranged under the panel lower cover PB. The first antenna area AA1 of the substrate SUB may be attached to the lower surface of the panel lower cover PB via a second adhesive member 392. The second adhesive member 392 may include a PSA.

The second antenna area AA2 of the substrate SUB may also be bent, and accordingly, at least a portion of the second antenna area AA2 may be arranged under the panel lower cover PB. The second antenna area AA2 of the substrate SUB may also be attached to the lower surface of the panel lower cover PB via an adhesive member. The adhesive member may include a PSA.

The display PCB 310 may be attached to the display pads DPD of the sub-area SBA of the substrate SUB by using a conductive adhesive member such as an anisotropic conductive film or anisotropic conductive paste. The display PCB 310 may include a connector 311 electrically connected to a flexible circuit board 312. The display PCB 310 may be electrically connected to a main circuit board 700 via the flexible circuit board 312.

The touch driving circuit 330 may be disposed on the display PCB 310. The touch driving circuit 330 may generate touch data according to changes in electrical signals respectively detected by the sensor electrodes of the sensor electrode layer SENL of the display panel 300 and transmit the touch data to a main processor 710 of the main circuit board 700, and the main processor 710 may analyze the touch data to calculate touch coordinates where a touch has occurred.

The first antenna PCB 341 may be attached to the first antenna pads APD1 of the first antenna area AA1 of the substrate SUB by using a conductive adhesive member such as an anisotropic conductive film or anisotropic conductive paste. The first connector 351 of the first antenna PCB 341 may be electrically connected to a connector 701 of the main circuit board 700. As described above, the first antenna area AA1 may be electrically connected to the main circuit board 700 via the first antenna PCB 341.

The second antenna PCB 342 may also be attached to the second antenna pads APD2 of the second antenna area AA2 of the substrate SUB by using a conductive adhesive member such as an anisotropic conductive film or anisotropic conductive paste. The second connector 352 of the second antenna PCB 342 may be electrically connected to a connector of the main circuit board 700. As described above, the second antenna area AA2 may be electrically connected to the main circuit board 700 via the second antenna PCB 342.

The main circuit board 700 may include a rigid PCB that is hard and thus is not easily bent. The main processor 710 and the antenna driving circuit 360 may be disposed on the main circuit board 700.

The antenna driving circuit 360 may be electrically connected to a feed line or antenna electrodes arranged in the first antenna area AA1 of the display panel 300 through the first antenna PCB 341. Also, the antenna driving circuit 360 may be electrically connected to a feed line or antenna electrodes arranged in the second antenna area AA2 of the display panel 300 through the second antenna PCB 342. Therefore, the antenna driving circuit 360 may receive, as inputs, electromagnetic wave signals (for example, electromagnetic signals) received by the antenna electrodes and may transmit, to the antenna electrodes, electromagnetic wave signals (for example, electromagnetic signals regarding electromagnetic waves) to be transferred. The antenna driving circuit 360 may be formed as an IC.

The antenna driving circuit 360 may process electromagnetic wave signals transmitted to or received by the antenna electrodes. For example, the antenna driving circuit 360 may change the amplitude of the electromagnetic wave signals received by the antenna electrodes. Alternatively, the antenna driving circuit 360 may change the phase as well as the amplitude of the electromagnetic wave signals received by the antenna electrodes. When desired, the antenna driving circuit 360 may transmit processed electromagnetic wave signals to a mobile communication module. The mobile communication module may be disposed on the main circuit board 700.

Also, when desired, the antenna driving circuit 360 may change the amplitude of an electromagnetic wave signal transmitted from the mobile communication module. Alternatively, the antenna driving circuit 360 may change the phase as well as the amplitude of the electromagnetic wave signal transmitted from the mobile communication module. The antenna driving circuit 360 may transmit processed electromagnetic wave signals to the antenna electrodes.

Figure 5:
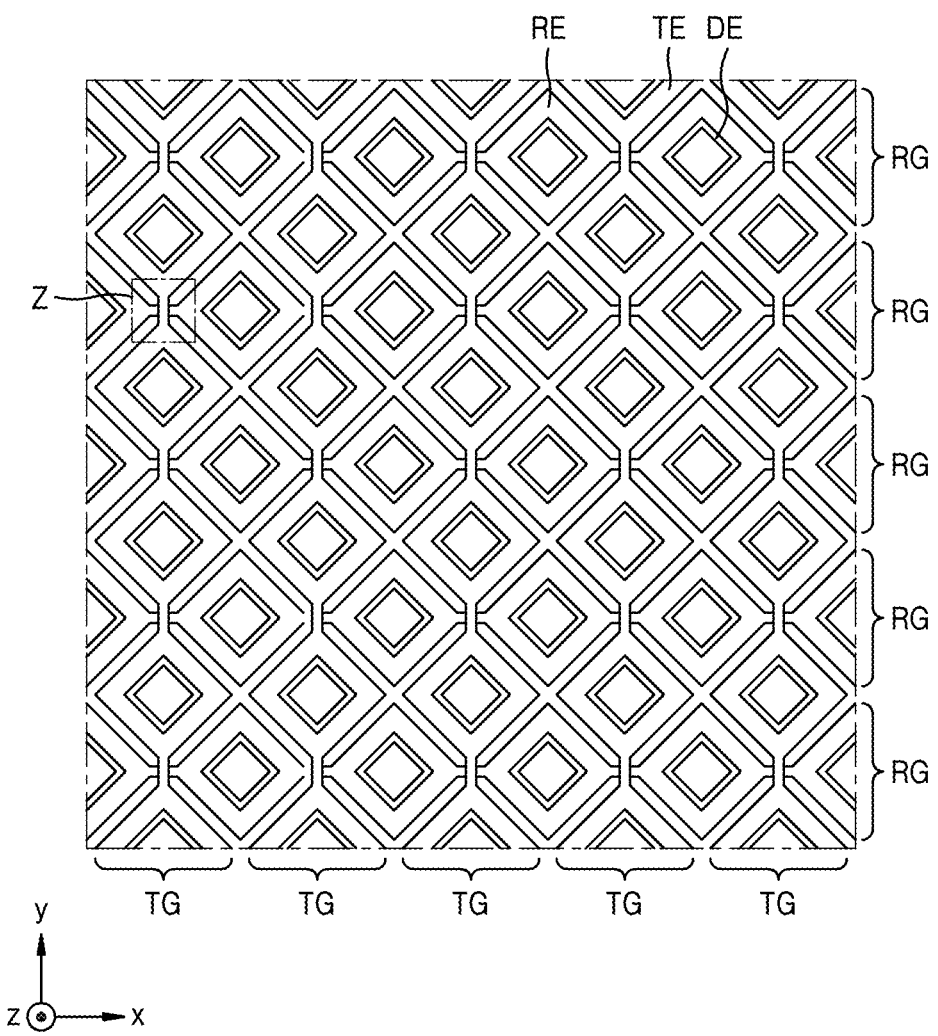
FIG. 5 is a schematic plan view illustrating a portion of a display area of the display apparatus of FIG. 1.
Figure 6:
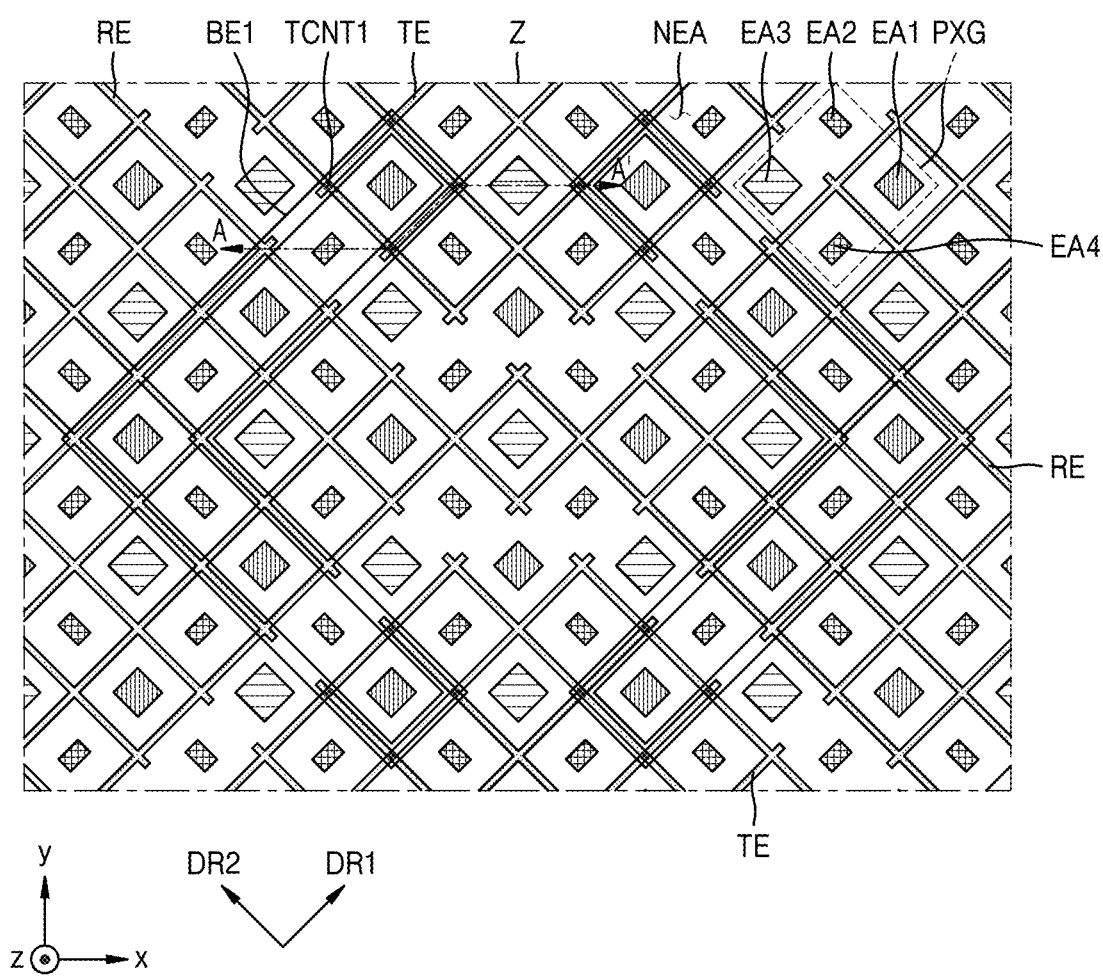
FIG. 6 is a schematic plan view illustrating a region Z of the display apparatus of FIG. 5.

FIG. 5 is a schematic plan view, for example, a layout, of a portion of a display area DA of the display apparatus 10 of FIG. 1, and FIG. 6 is a schematic plan view, for example, a layout, of a region Z of the display apparatus 10 of FIG. 5.

FIG. 5 shows that sensor electrodes of the sensor electrode layer SENL include two types of electrodes, for example, driving electrodes TE and sensing electrodes RE, and are driven using a mutual capacitance method in which, after driving signals are transmitted to the driving electrodes TE, a voltage charged in mutual capacitance is detected using the sensing electrodes RE. However, one or more embodiments are not necessarily limited thereto. For reference, only the sensor electrodes and dummy electrodes DE are shown in FIG. 5 for convenience of description.

The sensor electrodes may be electrodes that form mutual capacitance to detect touch of an object or person. As described above, the sensor electrodes may include the driving electrodes TE and the sensing electrodes RE. A sensing electrode RE may be referred to as a first sensor electrode, and a driving electrode TE may be referred to as a second sensor electrode. A sensing line electrically connected to the sensing electrodes RE, which may be referred to as first sensor electrodes, may be referred to as a first sensor line, and a driving line electrically connected to the driving electrodes TE may be referred to as a second sensor line.

A plurality of sensing electrode groups RG and a plurality of driving electrode groups TG may be arranged in the display area DA.

The plurality of sensing electrode groups RG extending in the first direction (x-axis direction) may be arranged in the second direction (y-axis direction). Each of the plurality of sensing electrode groups RG may include a plurality of sensing electrodes RE that are arranged in the first direction (x-axis direction) and electrically connected to each other. For example, sensing electrodes RE that are adjacent in the first direction (x-axis direction) may be electrically connected to each other, but sensing electrodes RE that are adjacent in the second direction (y-axis direction) may be electrically separated from each other.

The plurality of driving electrode groups TG extending in the second direction (y-axis direction) may be arranged in the first direction (x-axis direction). Each of the plurality of driving electrode groups TG may include a plurality of driving electrodes TE that are arranged in the second direction (y-axis direction) and electrically connected to each other. For example, driving electrodes TE that are adjacent in the second direction (y-axis direction) may be electrically connected to each other, but driving electrodes TE that are adjacent in the first direction (x-axis direction) may be electrically separated from each other.

When seen from the third direction (z-axis direction), for example, in a plan view, each dummy electrode DE may be surrounded by the driving electrodes TE or the sensing electrodes RE. For example, in a plan view, each dummy electrode DE may be surrounded by the driving electrodes TE or the sensing electrodes RE. In this case, each dummy electrode DE may be spaced apart from the driving electrodes TE or the sensing electrodes RE and thus may electrically float.

In FIG. 5, in a plan view, an outer shape of each driving electrode TE, an outer shape of each sensing electrode RE, and an outer shape of each dummy electrode DE are a rhombus shape, but one or more embodiments are not necessarily limited thereto. For example, the outer shape of each driving electrode TE, the outer shape of each sensing electrode RE, and the outer shape of each dummy electrode DE may be a rectangular, polygonal different from the rectangular, circular, or oval shape rather than the rhombus shape.

The plurality of sensing electrode groups RG may be electrically connected one-to-one to sensing lines. For example, each of the plurality of sensing electrode groups RG may be electrically connected to the sensing line at one end or the other end of the sensing electrode group RG in the first direction (x-axis direction). The sensing lines may be electrically connected to some of the display pads DPD arranged in the sub-area SBA. Accordingly, the sensing lines may be electrically connected to the touch driving circuit 330 through the electrically connected display pads DPD and the display PCB 310.

The plurality of driving electrode groups TG may be electrically connected one-to-one to driving lines. For example, each of the plurality of driving electrode groups TG may be electrically connected to the driving line at one end or the other end of the driving electrode group TG in the second direction (y-axis direction). The driving lines may be electrically connected to others of the display pads DPD arranged in the sub-area SBA. Accordingly, the driving lines may be electrically connected to the touch driving circuit 330 through the electrically connected display pads DPD and the display PCB 310.

Moreover, as shown in FIG. 6, the driving electrodes TE and the sensing electrodes RE are arranged on the same layer and thus may be spaced apart from each other. For example, a gap may be formed between the driving electrode TE and the sensing electrode RE. For reference, the dummy electrodes DE are also arranged on the same layer as the driving electrodes TE and the sensing electrodes RE, and thus, a gap may be formed between the driving electrode TE and the dummy electrode DE and between the sensing electrode RE and the dummy electrode DE.

First connectors BE1 may be arranged on a different layer from the driving electrodes TE and the sensing electrodes RE. When seen from the third direction (z-axis direction), each first connector BE1 may overlap two driving electrodes TE and one sensing electrode RE. In this case, the two driving electrodes TE may be adjacent to each other in the second direction (y-axis direction). FIG. 6 shows that the first connector BE1 overlaps a portion of each of the two driving electrodes TE and a portion of the one sensing electrode RE.

The driving electrodes TE adjacent to each other in the second direction (y-axis direction) may be electrically connected through at least one first connector BE1. For example, one side of the first connector BE1 may be electrically connected, through a first touch contact hole TCNT1, to one driving electrode TE of the driving electrodes TE adjacent to each other in the second direction (y-axis direction), and the other side of the first connector BE1 may be electrically connected, through the first touch contact hole TCNT1, to the other driving electrode TE of the driving electrodes TE adjacent to each other in the second direction (y-axis direction).

When seen from the third direction (z-axis direction), the first connector BE1 may have a shape that is bent at least once. In FIG. 6, the first connector BE1 is shown as having an angle bracket shape ("<" or ">"), but one or more embodiments are not necessarily limited thereto. As shown in FIG. 6, the driving electrodes TE adjacent to each other in the second direction (y-axis direction) are electrically connected by the plurality of first connectors BE1, and thus, even when one of the first connectors BE1 is disconnected, the driving electrodes TE adjacent to each other in the second direction (y-axis direction) may be stably electrically connected by the other first connectors BE1. For reference, FIG. 6 shows that the driving electrodes TE adjacent to each other are electrically connected by two first connectors BE1, but the number of first connectors BE1 that connect the driving electrodes TE adjacent to each other is not necessarily limited thereto.

As described above, the driving electrodes TE and the sensing electrodes RE may be electrically separated at intersections thereof by the first connectors BEL. As a result, mutual capacitance may be formed between the driving electrodes TE and the sensing electrodes RE.

When seen from the third direction (z-axis direction), for example, in a plan view, each driving electrode TE and each sensing electrode RE may have a mesh-shape structure or a net-shape structure as shown in FIG. 6. The same applies to each dummy electrode DE. Accordingly, each of the driving electrodes TE, the sensing electrodes RE, the first connectors BE1, and the dummy electrodes DE may be prevented from overlapping emission areas EA1, EA2, EA3, and EA4, or the degree of overlap may be significantly reduced. As a result, by preventing or significantly reducing light emitted from the emission areas EA1, EA2, EA3, and EA4 from being covered by the driving electrodes TE, the sensing electrodes RE, the first connectors BE1, and the dummy electrodes DE, a decrease in luminance of an image implemented in the display apparatus 10 may be prevented or significantly reduced.

First emission areas EA1 may emit light of a first color, second emission areas EA2 may emit light of a second color, third emission areas EA3 may emit light of a third color, and fourth emission areas EA4 may emit light of a fourth color. For example, the first color may be red, the second color and the fourth color may be green, and the third color may be blue. However, one or more embodiments are not necessarily limited thereto.

In a plan view, each of the first emission areas EA1, the second emission areas EA2, the third emission areas EA3, and the fourth emission areas EA4 may have a rhombus shape or a rectangular shape. However, one or more embodiments are not necessarily limited thereto. In a plan view, each of the first emission areas EA1, the second emission areas EA2, the third emission areas EA3, and the fourth emission areas EA4 may have a polygonal other than the rectangular shape, circular, or oval shape. Also, FIG. 6 shows that the area of the third emission areas EA3 is the largest, and the areas of the second emission areas EA2 and the fourth emission areas EA4 are the smallest, but one or more embodiments are not necessarily limited thereto.

A set of a first emission area EA1, a second emission area EA2, a third emission area EA3, and a fourth emission area EA4, which are adjacent to each other, may be defined as one pixel group PXG for expressing white gradation. For example, the white gradation may be expressed by a combination of light emitted from the first emission area EA1, light emitted from the second emission area EA2, light emitting from the third emission area EA3, and light emitted from the fourth emission area EA4. The pixel group PXG may also express gradations of other colors.

Assuming that rows extending in the first direction (x-axis direction) are arranged in the second direction (y-axis direction), as shown in FIG. 6, the second emission areas EA2 and the fourth emission areas EA4 may be arranged in odd-numbered rows. In addition, the first emission areas EA1 and the third emission areas EA3 may be arranged in even-numbered rows.

When only the odd-numbered rows are considered, the second emission areas EA2 and the fourth emission areas EA4 may be alternately arranged in the second direction (y-axis direction). When a first tilt direction DR1 between the first direction (x-axis direction) and the second direction (y-axis direction) and a second tilt direction DR2 perpendicular to the first tilt direction DR1 are considered, the fourth emission area EA4 may have long sides in the first tilt direction DR1 and short sides in the second tilt direction DR2, whereas the second emission area EA2 may have long sides in the second tilt direction DR2 and short sides in the first tilt direction DR1.

When only the even-numbered rows are considered, the first emission areas EA1 and the third emission areas EA3 may alternately arranged in the second direction (y-axis direction).

Figure 7:
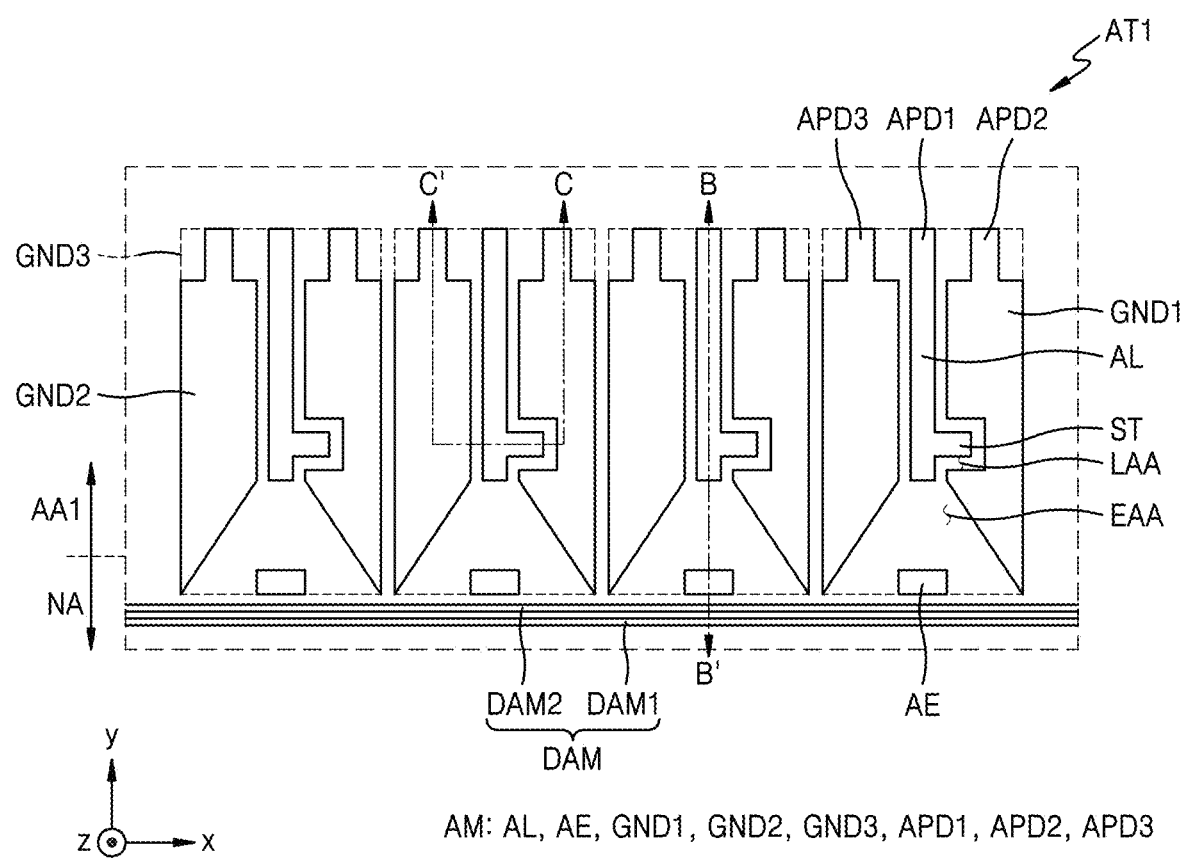
FIG. 7 is a schematic plan view illustrating a first antenna arranged in a first antenna area of FIG. 1.
Figure 8:
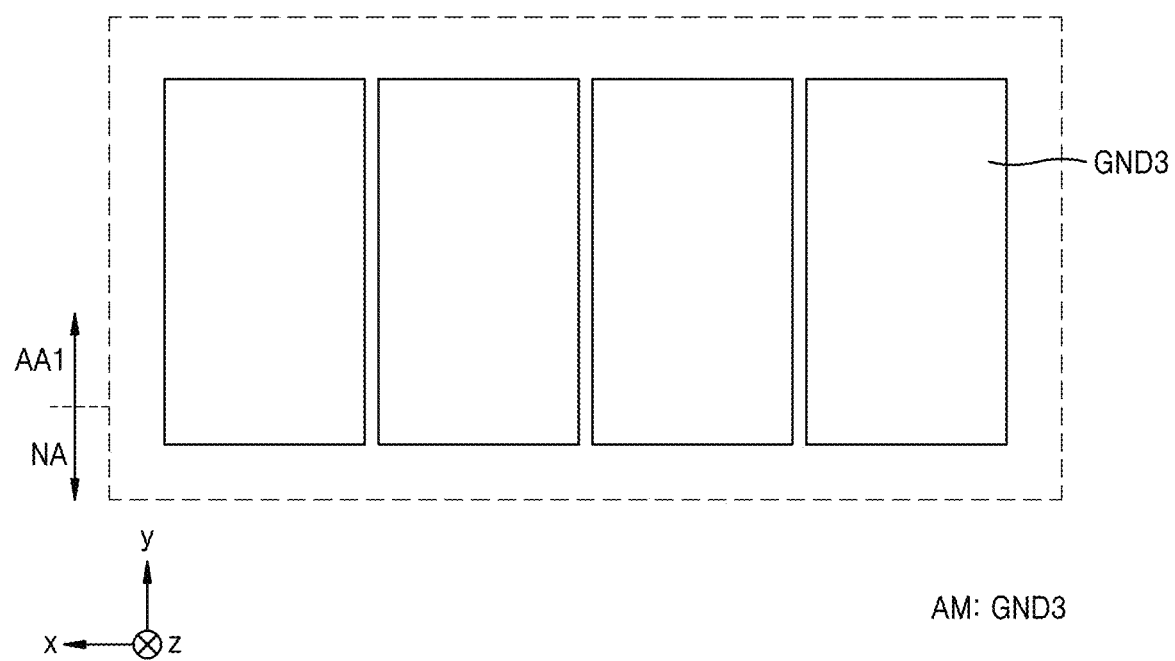
FIG. 8 is a schematic bottom view illustrating a first antenna arranged in a first antenna area of FIG. 1.

FIG. 7 is a schematic plan view illustrating the first antenna AT1 arranged in the first antenna area AA1 of FIG. 1, and FIG. 8 is a schematic bottom view illustrating the first antenna AT1 arranged in the first antenna area AA1 of FIG. 1.

The first antenna AT1 may include a plurality of antenna modules AM arranged in the first direction (x-axis direction). For convenience of description, FIG. 7 shows that the antenna modules AM are arranged in the first direction (x-axis direction). Each antenna module AM may include an antenna electrode AE, a feed line AL, a first ground electrode GND1, a second ground electrode GND2, a third ground electrode GND3, a first antenna pad APD1, a second antenna pad APD2, and a third antenna pad APD3. The antenna module AM may be arranged across the first antenna area AA1 and an area NA the disposed between the first antenna area AA1 and the display area DA. The antenna module AM may be arranged in a feed area LAA and a radiation area EAA, in which case the feed area LAA may be a portion of the first antenna area AA1, and the radiation area EAA may include other portions of the first antenna area AA1 and a portion of the area NA.

The feed line AL may be arranged in the feed area LAA, and the antenna electrode AE may be arranged in the radiation area EAA. The first ground electrode GND1, the second ground electrode GND2, and the third ground electrode GND3 may be arranged in the feed area LAA and the radiation area EAA. The first antenna pad APD1, the second antenna pad APD2, and the third antenna pad APD3 may be arranged in the feed area LAA.

The antenna electrode AE may be disposed on the upper surface of the substrate SUB. The antenna electrode AE may be arranged in the area NA. The antenna electrode AE may be arranged farther from the display area DA than a dam DAM in the peripheral area NDA. For example, the antenna electrode AE may be between the dam DAM and an edge of the substrate SUB. The dam DAM may include a first dam DAM1 and a second dam DAM2 that is arranged closer to the edge of the substrate SUB than to the first dam DAM1. The dam DAM may be arranged to surround the display area DA.

In a plan view, the antenna electrode AE may have a rectangular shape. The antenna electrode AE may be a parasitic patch antenna, in which case the antenna electrode AE may adjust performance of the first antenna AT1 according to the effect of a lower dielectric and conductor. As described above, when the antenna electrode AE is a parasitic patch antenna, the antenna electrode AE having an island shape might not be electrically connected to the feed line AL but may be spaced apart from the feed line AL.

A length of the antenna electrode AE in the second direction (y-axis direction) may be less than a distance from a boundary between the area NA and the first antenna area AA1 to the dam DAM. For example, in order to significantly reduce the area of a bezel, the distance from the boundary between the area NA and the first antenna area AA1 to the dam DAM may be about 300 μm. In this case, the length of the antenna electrode AE in the second direction (y-axis direction) may be 300 μm or less.

A length of the antenna electrode AE in the first direction (x-axis direction) may be determined according to a frequency of an electromagnetic wave to be transferred or received using the antenna electrode AE. The length of the antenna electrode AE in the first direction (x-axis direction) may be set to have a resonance length of half ($\lambda g/2$) of a guided wavelength of the feed line AL. For example, when the frequency of the electromagnetic wave to be transferred or received using the antenna electrode AE is about 60 GHz, the length of the antenna electrode AE in the first direction (x-axis direction) may be about 2.5 mm.

The feed line AL may be disposed on the upper surface of the substrate SUB to be arranged in the first antenna area AA1. A direction in which the feed line AL extends may be the same as a direction in which the first antenna area AA1 protrudes. For example, as shown in FIGS. 1 and 2, the first antenna area AA1 protrudes in the second direction (y-axis direction) from the upper side of the display area DA, and thus, the feed line AL may have a shape extending in the second direction (y-axis direction). As shown in FIGS. 1 and 2, the second antenna area AA2 protrudes in the first direction (x-axis direction) from the left side of the display area DA, and thus, the feed line AL in the second antenna area AA2 may have a shape extending in the first direction (x-axis direction).

A stub ST may protrude from one side of the feed line AL. For example, as shown in FIG. 7, the stub ST may protrude in the first direction (x-axis direction) from one side of the feed line AL. The stub ST might not only facilitate impedance matching between the feed line AL and the antenna electrode AE, but also increases radiation performance of an antenna by changing a phase of a radiation pattern of electromagnetic waves. As described above with reference to FIG. 2, the first antenna area AA1 is bent such that at least a portion of the first antenna area AA1 may be located under the display area DA. Considering the above, the stub ST may be located adjacent to the radiation area EAA. For example, as shown in FIG. 7, the stub ST may be arranged closer to one end of the feed line AL in a direction of the radiation area EAA than to the other end of the feed line AL in a direction of the first antenna pad APD1.

The first ground electrode GND1 and the second ground electrode GND2 may be disposed on the upper surface of the substrate SUB. The first ground electrode GND1 and the second ground electrode GND2 may be arranged in the first antenna area AA1 and the area NA.

The first ground electrode GND1 may be arranged on one side of the feed line AL, and the second ground electrode GND2 may be arranged on the other side of the feed line AL. The first ground electrode GND1 and the second ground electrode GND2 may be arranged to be spaced apart from the feed line AL. A ground voltage may be applied to the first ground electrode GND1 and the second ground electrode GND2.

As described above, because the stub ST protruding in the first direction (x-axis direction) from the feed line AL exists, the area of the first ground electrode GND1 located on a side of the feed line AL where the stub ST exists may be less than the area of the second ground electrode GND2 located on the opposite side of the feed line AL. Each of the area of the first ground electrode GND1 and the area of the second ground electrode GND2 may be greater than the area of the feed line AL.

In a plan view, the radiation area EAA may have a tapered slot shape for transmission and reception of wideband electromagnetic waves. For example, a distance between the first ground electrode GND1 and the second ground electrode GND2 may increase from the feed line AL toward the antenna electrode AE. Also, a width of the first ground electrode GND1 may decrease in a direction from the radiation area EAA to the dam DAM. For example, the width of the first ground electrode GND1 may decrease from a boundary between the feed area LAA and the radiation area EAA toward an end of the first ground electrode GND1 arranged in the radiation area EAA. Similarly, a width of the second ground electrode GND2 may decrease in a direction from the radiation area EAA to the dam DAM. For example, the width of the second ground electrode GND2 may decrease from the boundary between the feed area LAA and the radiation area EAA toward an end of the second ground electrode GND2 arranged in the radiation area EAA.

As described above, when the radiation area EAA has a tapered slot shape, a central area of the radiation area EAA becomes empty, and thus, electromagnetic waves radiating from the radiation area EAA may be easily affected by an external dielectric and external conductor. Accordingly, in order to prevent or significantly reduce the effect from the external dielectric or external conductor, the antenna electrode AE spaced apart from the feed line AL, the first ground electrode GND1, and the second ground electrode GND2 may be arranged in the radiation area EAA. In this sense, the antenna electrode AE may be referred to as a parasitic patch antenna. Accordingly, the effect of the electromagnetic waves radiating from the feed line AL in the radiation area EAA by the external dielectric and external conductor may be reduced, and impedance between the antenna electrode AE and the feed line AL may be matched.

Electromagnetic waves radiating from an end of the feed line AL in the radiation area EAA may proceed toward the antenna electrode AE through insulating layers 130, 141, and 142 (see FIG. 10) of the display panel 300 corresponding to dielectric layers. The antenna electrode AE may radiate the electromagnetic waves from the end of the feed line AL in a top direction (+z direction) of the display panel 300.

The antenna electrode AE, the feed line AL, the first ground electrode GND1, and the second ground electrode GND2 as described above may be simultaneously formed with the same material through the same process. Accordingly, the antenna electrode AE, the feed line AL, the first ground electrode GND1, and the second ground electrode GND2 may be located on the same layer.

Moreover, as shown in FIG. 8, the third ground electrode GND3 may be arranged on the lower surface of the substrate SUB. The third ground electrode GND3 may be arranged in the first antenna area AA1 and the area NA. A ground voltage may be applied to the third ground electrode GND3.

As shown in FIGS. 7 and 8, when seen from the third direction (z-axis direction), the third ground electrode GND3 may overlap the feed line AL, the first ground electrode GND1, and the second ground electrode GND2. Due to the first ground electrode GND1, the second ground electrode GND2, and the third ground electrode GND3, the feed line AL may have a ground coplanar waveguide (GCPW) structure.

As shown in FIG. 7, the first antenna pad APD1, the second antenna pad APD2, and the third antenna pad APD3 may be disposed on the upper surface of the substrate SUB. The first antenna pad APD1, the second antenna pad APD2, and the third antenna pad APD3 may be arranged on one edge of the first antenna area AA1. The first antenna pads APD1 may be electrically connected to one end of the feed line AL. The first antenna pad APD1 may be integrally formed as a single body with the feed line AL. The second antenna pad APD2 may be electrically connected to one end of the first ground electrode GND1. The second antenna pad APD2 may be integrally formed as a single body with the first ground electrode GND1. The third antenna pad APD3 may be electrically connected to one end of the second ground electrode GND2. The third antenna pad APD3 may be integrally formed as a single body with the second ground electrode GND2.

The first antenna pad APD1, the second antenna pad APD2, and the third antenna pad APD3 may be electrically connected to the first antenna PCB 341 via a conductive adhesive member CAM (see FIG. 11) such as an anisotropic conductive film or anisotropic conductive paste.

Figure 9:
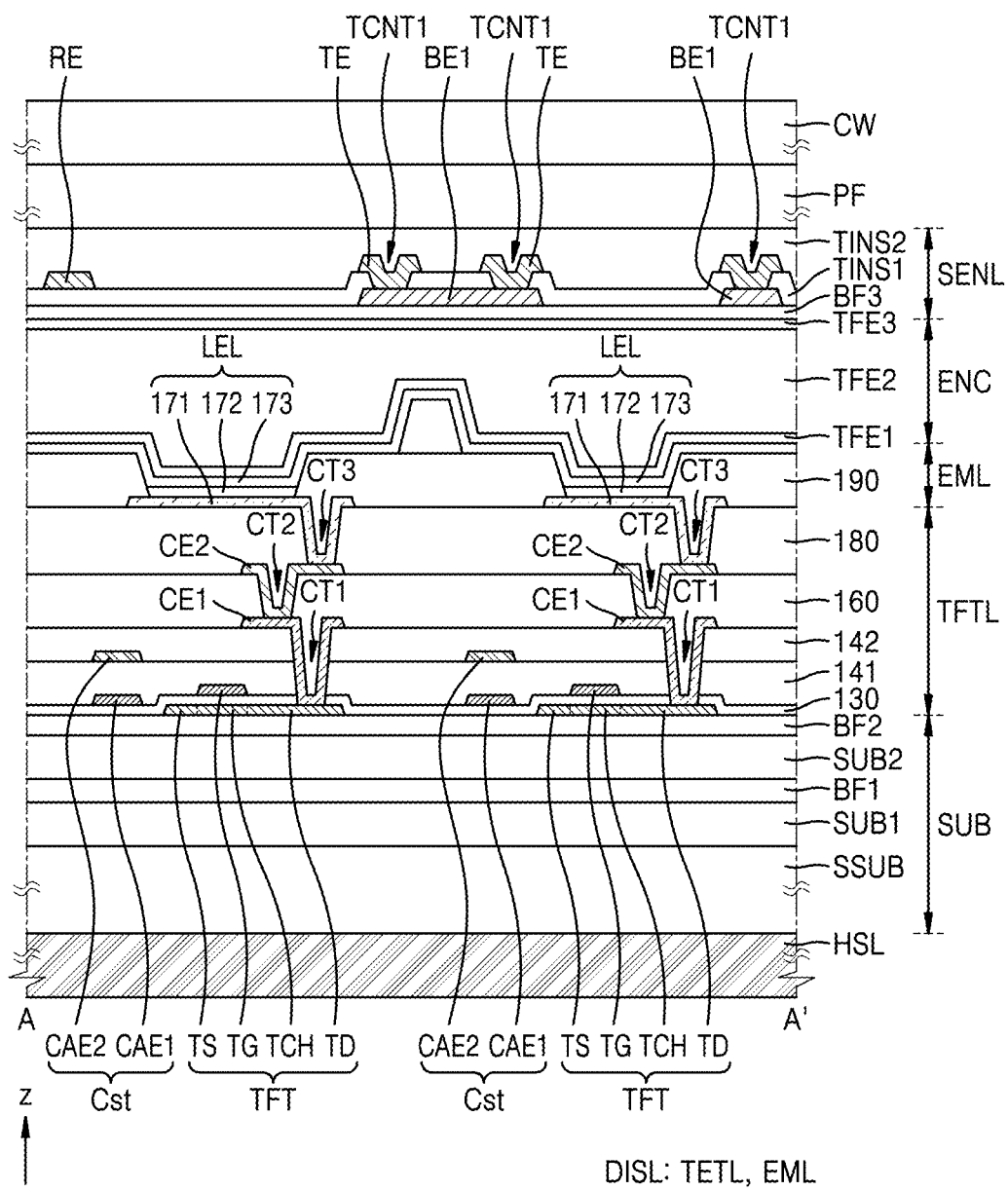
FIG. 9 is a schematic cross-sectional view illustrating the display apparatus taken along a line A-A' of FIG. 6.

FIG. 9 is a schematic cross-sectional view illustrating the display apparatus 10 taken along a line A-A' of FIG. 6. As shown in FIG. 9, the display layer DISL including a thin-film transistor layer TFTL and a light-emitting element layer EML may be disposed on one surface of the substrate SUB, the encapsulation layer ENC may be disposed on the display layer DISL, and the sensor electrode layer SENL including sensor electrodes may be disposed on the encapsulation layer ENC. The polarizing film PF may be disposed on the sensor electrode layer SENL, and the cover window CW may be disposed on the polarizing film PF.

The substrate SUB may include a support substrate SSUB, a first substrate SUB1, a first buffer layer BF1, a second substrate SUB2, and a second buffer layer BF2. The first substrate SUB1 may be disposed on the support substrate SSUB, the first buffer layer BF1 may be disposed on the first substrate SUB1, the second substrate SUB2 may be disposed on the first buffer layer BF1, and the second buffer layer BF2 may be disposed on the second substrate SUB2.

The support substrate SSUB may support the first substrate SUB1 and the second substrate SUB2, which are flexible, and for this, the support substrate SSUB may have higher rigidity than the first substrate SUB1 and the second substrate SUB2. The support substrate SSUB may be a substrate including a plastic material such as polycarbonate (PC) or polyethylene terephthalate (PET), or may be a glass substrate.

Each of the first substrate SUB1 and the second substrate SUB2 may include an organic material such as acrylic resin, epoxy resin, phenolic resin, polyamide resin, or polyimide resin. The first substrate SUB1 and the second substrate SUB2 may include the same material, but may also include different materials when desired.

Each of the first buffer layer BF1 and the second buffer layer BF2 may include an inorganic material such as silicon nitride, silicon oxynitride, silicon oxide, titanium oxide, or aluminum oxide. When desired, each of the first buffer layer BF1 and the second buffer layer BF2 may include a plurality of layers including the aforementioned inorganic material. The first buffer layer BF1 and the second buffer layer BF2 may include the same inorganic material or different inorganic materials.

An active layer may be disposed on the second buffer layer BF2, the active layer including a channel region TCH, a source region TS, and a drain region TD of a thin-film transistor TFT. The active layer may include polycrystalline silicon, single crystalline silicon, amorphous silicon, or an oxide semiconductor material. At least a portion of the active layer may be doped when desired.

A gate insulating layer 130 may cover the active layer of the thin-film transistor TFT. The gate insulating layer 130 may be an inorganic layer and may include, for example, silicon nitride, silicon oxynitride, silicon oxide, titanium oxide, or aluminum oxide.

A gate electrode TG of the thin-film transistor TFT and a first capacitor CAE1 may be disposed on the gate insulating layer 130. When seen from the third direction (z-axis direction), the gate electrode TG of the thin-film transistor TFT may overlap the channel region TCH. Each of the gate electrode TG and the first capacitor CAE1 may include molybdenum (Mo), aluminum (Al), chromium (Cr), gold (Au), titanium (Ti), nickel (Ni), neodymium (Nd), and copper (Cu), or any alloy thereof, and may have a single-layer structure or a multilayer structure. For example, the gate electrode TG may have a three-layer structure of Mo/Al/Mo.

A first interlayer insulating layer 141 may cover the gate electrode TG and the first capacitor CAE1. The first interlayer insulating layer 141 may be an inorganic layer and may include, for example, silicon nitride, silicon oxynitride, silicon oxide, titanium oxide, or aluminum oxide. The first interlayer insulating layer 141 may include a plurality of inorganic layers.

A second capacitor electrode CAE2 may be disposed on the first interlayer insulating layer 141. When seen from the third direction (z-axis direction), the second capacitor electrode CAE2 may overlap the first capacitor CAE1. Accordingly, a capacitor Cst may be formed by the first capacitor CAE1, the second capacitor electrode CAE2, and an insulating layer that is located therebetween and serves as a dielectric layer. The second capacitor electrode CAE2 may include Mo, Al, Cr, Au, Ti, Ni, Nd, Cu, or any alloy thereof, and may have a single-layer structure or a multilayer structure. For example, the second capacitor electrode CAE2 may have a three-layer structure of Mo/Al/Mo.

A second interlayer insulating layer 142 may cover the second capacitor electrode CAE2. The second interlayer insulating layer 142 may be an inorganic layer and may include, for example, silicon nitride, silicon oxynitride, silicon oxide, titanium oxide, or aluminum oxide. The second interlayer insulating layer 142 may include a plurality of inorganic layers.

A first connection electrode CE1 may be disposed on the second interlayer insulating layer 142. The first connection electrode CE1 may be electrically connected to the drain region TD through a first contact hole CT1 passing through the gate insulating layer 130, the first interlayer insulating layer 141, and the second interlayer insulating layer 142. The first connection electrode CE1 may include Mo, Al, Cr, Au, Ti, Ni, Nd, Cu, or any alloy thereof, and may have a single-layer structure or a multilayer structure. For example, the first connection electrode CE1 may have a three-layer structure of Ti/Al/Ti.

A first organic layer 160 covers the first connection electrode CE1 to reduce the occurrence of steps due to thin-film transistors TFT under the first organic layer 160, and thus may have a substantially flat top surface. The first organic layer 160 may include an organic material such as acrylic resin, epoxy resin, phenolic resin, polyamide resin, or polyimide resin.

A second connection electrode CE2 may be disposed on the first organic layer 160. The second connection electrode CE2 may be electrically connected to the first connection electrode CE1 through a second contact hole CT2 passing through the first organic layer 160. The second connection electrode CE2 may include Mo, Al, Cr, Au, Ti, Ni, Nd, Cu, or any alloy thereof, and may have a single-layer structure or a multilayer structure. For example, the second connection electrode CE2 may have a three-layer structure of Ti/Al/Ti.

A second organic layer 180 may cover the second connection electrode CE2. The second organic layer 180 may include an organic material such as acrylic resin, epoxy resin, phenolic resin, polyamide resin, or polyimide resin.

The light-emitting element layer EML may be disposed on the thin-film transistor layer TFTL. The light-emitting element layer EML may include light-emitting elements LEL and a bank 190.

Each light-emitting element LEL may include a pixel electrode 171, an intermediate layer 172 including an emission layer, and a common electrode 173. Each of the emission areas EA1, EA2, EA3, and EA4 described above with reference to FIG. 6 represents an area in which the pixel electrode 171, the intermediate layer 172, and the common electrode 173 are sequentially stacked, and holes from the pixel electrode 171 and electrons from the common electrode 173 combine with each other in the emission layer included in the intermediate layer 172 to emit light.

The pixel electrode 171 may be disposed on the second organic layer 180. The pixel electrode 171 may be electrically connected to the second connection electrode CE2 through a third contact hole CT3 passing through the second organic layer 180. The pixel electrode 171 may include a light-transmissive conductive layer including a transmissive conductive oxide such as indium tin oxide (ITO), indium oxide ($In_2O_3$), or indium zinc oxide (IZO), and a reflective layer including a metal such as Al or Ag. For example, the pixel electrode 171 may have a three-layer structure of ITO/Ag/ITO.

The bank 190 defines the emission areas EA1, EA2, EA3, and EA4 of display pixels. For this, the bank 190 may have an opening that exposes a portion of the pixel electrode 171 on the second organic layer 180. The bank 190 may cover edges of the pixel electrode 171. The bank 190 may include an organic material such as acrylic resin, epoxy resin, phenolic resin, polyamide resin, polyimide resin, or hexamethyldisiloxane (HMDSO).

When desired, a spacer may be disposed on the bank 190. The spacer may support a mask used in a process of forming the intermediate layer 172. The spacer may include an organic material such as acrylic resin, epoxy resin, phenolic resin, polyamide resin, or polyimide resin.

The intermediate layer 172 may be disposed on the pixel electrode 171. The intermediate layer 172 may include an emission layer. The emission layer may include an organic material including a fluorescent or phosphorescent material emitting red light, green light, blue light, or white light. The emission layer may include a low-molecular weight organic material or a polymer organic material, and functional layers such as a hole transport layer (HTL), a hole injection layer (HIL), an electron transport layer (ETL), and an electron injection layer (EIL) may be selectively arranged under and over the emission layer.

The emission layer may be patterned to correspond to each pixel electrode 171. Layers other than the emission layer included in the intermediate layer 172 may be variously modified, for example, may be integrally provided over a plurality of pixel electrodes 171.

The common electrode 173 disposed on the intermediate layer 172 may be a transmissive electrode or a reflective electrode. For example, the common electrode 173 may be a transparent or translucent electrode and may include a metal thin film having a low work function and including lithium (Li), calcium (Ca), Al, Ag, magnesium (Mg), and any compound thereof or lithium fluoride (LiF). As used herein, the phrase "low work function" may mean a material with a work function less than about 3.5 eV. Also, the common electrode 173 may further include a transparent conductive oxide (TCO) layer, such as ITO, IZO, zinc oxide (ZnO), or In2O3, on the metal thin film. The common electrode 173 may be integrally formed as a single body over the entire display area DA and arranged over the plurality of pixel electrodes 171. A capping layer may be disposed on the common electrode 173.

The encapsulation layer ENC may be disposed on the light-emitting element layer EML. The encapsulation layer ENC may prevent external oxygen or moisture from penetrating into the light-emitting element layer EML and may include an inorganic layer and an organic layer. FIG. 9 shows that the encapsulation layer ENC includes a first encapsulation inorganic layer TFE1, a second encapsulation inorganic layer TFE3, and an encapsulation organic layer TFE2 therebetween. Each of the first encapsulation inorganic layer TFE1 and the second encapsulation inorganic layer TFE3 may include silicon nitride, silicon oxynitride, silicon oxide, titanium oxide, or aluminum oxide, and may have a single-layer structure or a multilayer structure. The encapsulation organic layer TFE2 may be an organic layer including acrylic resin, epoxy resin, phenolic resin, polyamide resin, or polyimide resin.

The sensor electrode layer SENL as described above with reference to FIGS. 5 and 6 may be disposed on the encapsulation layer ENC. As shown in FIG. 9, when desired, the sensor electrode layer SENL may include a third buffer layer BF3 on the encapsulation layer ENC. The third buffer layer BF3 may be a layer including an insulating function and/or an optical function. The third buffer layer BF3 may include at least one inorganic layer. For example, the third buffer layer BF3 may include silicon nitride, silicon oxynitride, silicon oxide, titanium oxide, or aluminum oxide, and may have a single-layer structure or a multilayer structure.

The first connectors BE1 of the sensor electrode layer SENL may be disposed on the third buffer layer BF3. The first connectors BE1 may each include Mo, Al, Cr, Au, Ti, Ni, Nd, Cu, any alloy thereof, or an Ag—Pd—Cu (APC) alloy, and may have a single-layer structure or a multilayer structure. For example, the first connectors BE1 may each have a three-layer structure of Ti/Al/Ti, a three-layer structure of ITO/Al/ITO, or a three-layer structure of ITO/APC/ITO.

A first sensor insulating layer TINS1 may cover the first connectors BE1. The first sensor insulating layer TINS1 may have insulating and optical functions. The first sensor insulating layer TINS1 may include silicon nitride, silicon oxynitride, silicon oxide, titanium oxide, or aluminum oxide.

The driving electrodes TE and the sensing electrodes RE may be disposed on the first sensor insulating layer TINS1. Also, the dummy electrodes DE (see FIG. 5) may also be disposed on the first sensor insulating layer TINS1. The driving electrodes TE, the sensing electrodes RE, and the dummy electrodes DE do not overlap the emission areas EA1, EA2, EA3, and EA4. Each of the driving electrodes TE, the sensing electrodes RE, and the dummy electrodes DE may include Mo, Al, Cr, Au, Ti, Ni, Nd, Cu, any alloy thereof, or an APC alloy, and may have a single-layer structure or a multilayer structure. For example, each of the driving electrodes TE, the sensing electrodes RE, and the dummy electrodes DE may have a three-layer structure of Ti/Al/Ti, a three-layer structure of ITO/Al/ITO, or a three-layer structure of ITO/APC/ITO.

A second sensor insulating layer TINS2 cover the driving electrodes TE, the sensing electrodes RE, and the dummy electrodes DE. The second sensor insulating layer TINS2 may be a layer having insulating and optical functions. The second sensor insulating layer TINS2 may be an inorganic layer or an organic layer. When the second sensor insulating layer TINS2 is an inorganic layer, the second sensor insulating layer TINS2 may include silicon nitride, silicon oxynitride, silicon oxide, titanium oxide, or aluminum oxide. When the second sensor insulating layer TINS2 is an organic layer, the second sensor insulating layer TINS2 may include acrylic resin, epoxy resin, phenolic resin, polyamide resin, or polyimide resin.

A heat dissipation layer HSL of the panel lower cover PB may be disposed on the lower surface of the support substrate SSUB of the substrate SUB. The heat dissipation layer HSL may include a metal thin film, such as copper, nickel, ferrite, or silver, which may shield electromagnetic waves and has excellent thermal conductivity.

Figure 10:
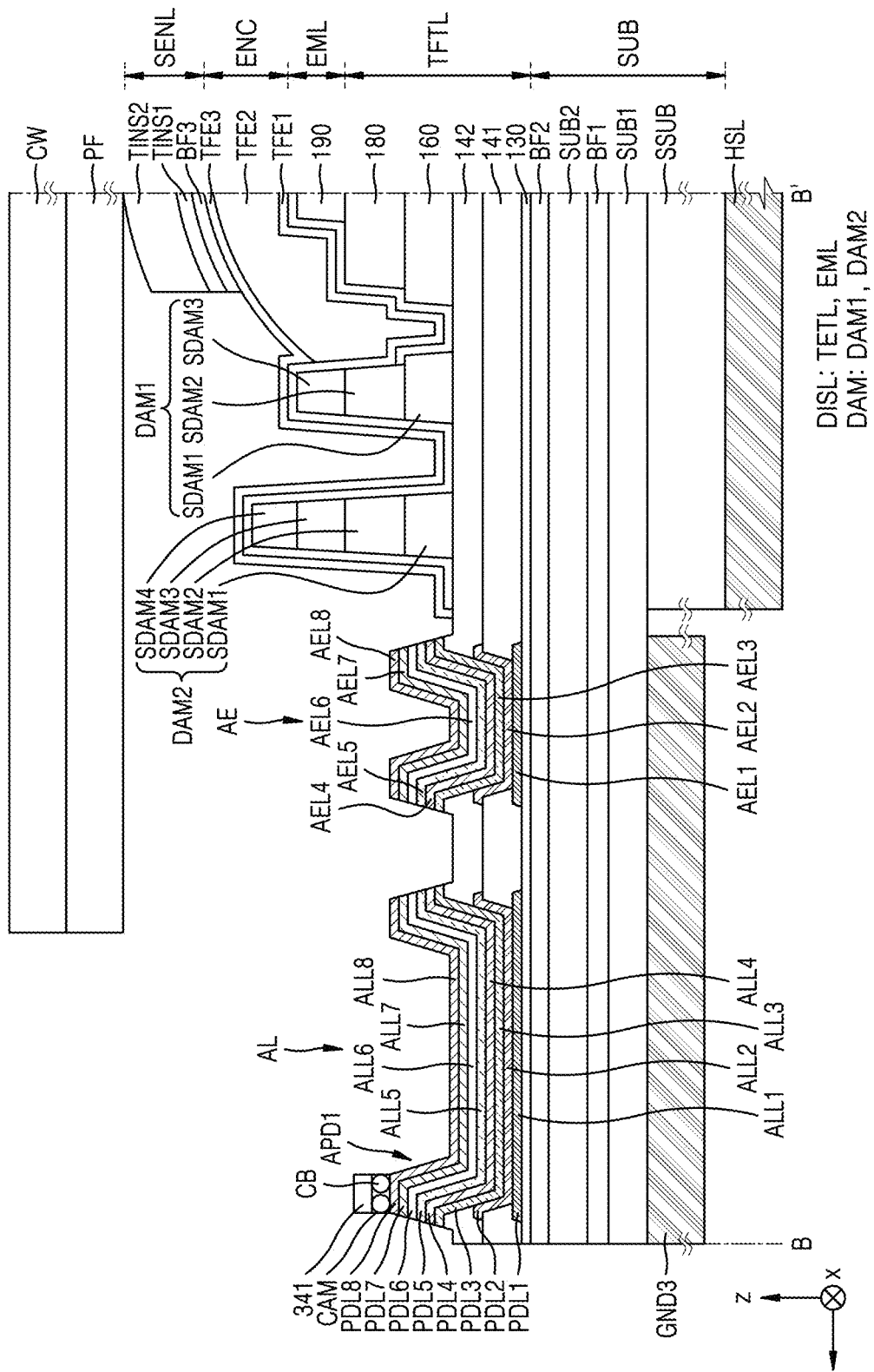
FIG. 10 is a schematic cross-sectional view illustrating the display apparatus taken along a line B-B' of FIG. 7.
Figure 11:
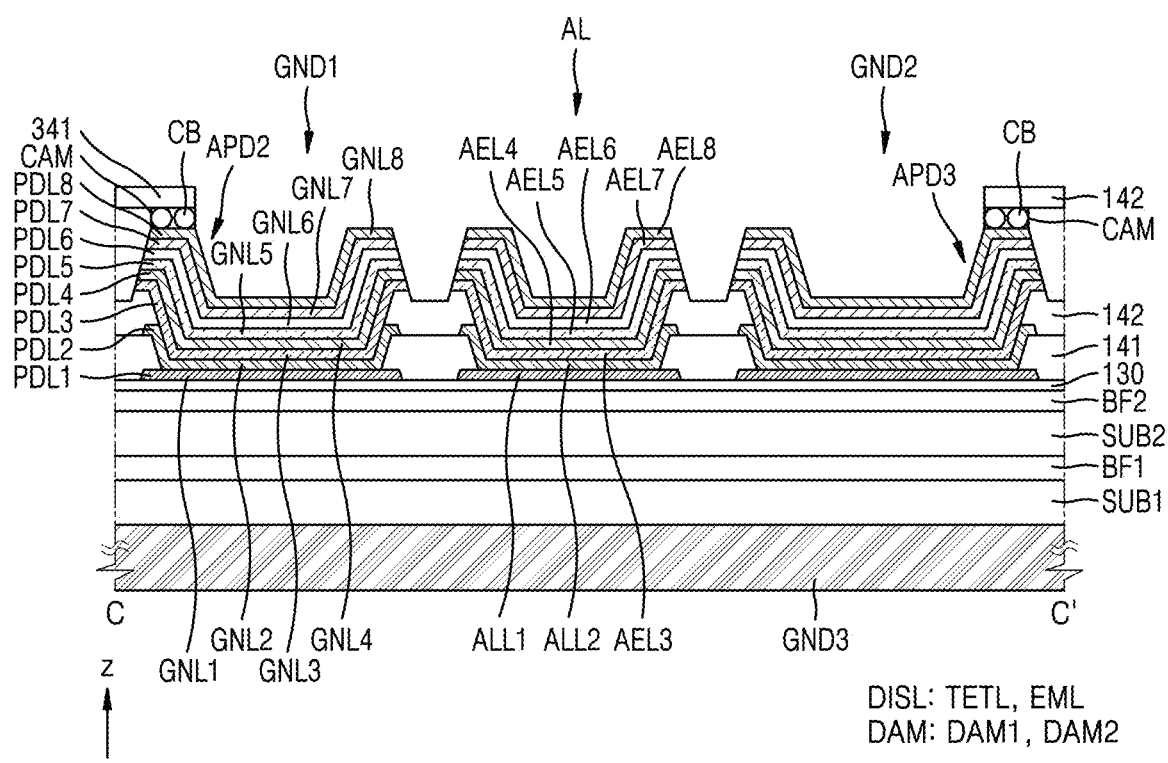
FIG. 11 is a schematic cross-sectional view illustrating the display apparatus taken along a line C-C' of FIG. 7.

FIG. 10 is a schematic cross-sectional view illustrating the display apparatus 10 taken along a line B-B' of FIG. 7, and FIG. 11 is a schematic cross-sectional view illustrating the display apparatus 10 taken along a line C-C' of FIG. 7.

As shown in FIG. 10, the dam DAM surrounding the display area DA may be arranged in the peripheral area NDA of the display panel 300. When the encapsulation organic layer TFE2 of the encapsulation layer ENC is formed, the dam DAM may prevent a material for forming the encapsulation organic layer TFE2 from overflowing to the outside of the substrate SUB. The dam DAM may include the first dam DAM1 and the second dam DAM2 that is arranged at a periphery further than the first dam DAM1. The first dam DAM1 and the second dam DAM2 may be disposed on the second interlayer insulating layer 142.

The first dam DAM1 may include a first sub-dam SDAM1, a second sub-dam SDAM2, and a third sub-dam SDAM3, which are sequentially stacked. The first sub-dam SDAM1 may be simultaneously formed with the same material as the first organic layer 160, the second sub-dam SDAM2 may be simultaneously formed with the same material as the second organic layer 180, and the third sub-dam SDAM3 may be simultaneously formed with the same material as the bank 190.

The second dam DAM2 may include a first sub-dam SDAM1, a second sub-dam SDAM2, a third sub-dam SDAM3, and a fourth sub-dam SDAM4, which are sequentially stacked. The first sub-dam SDAM1 may be simultaneously formed with the same material as the first organic layer 160, and the second sub-dam SDAM2 may be simultaneously formed with the same material as the second organic layer 180. The third sub-dam SDAM3 may be simultaneously formed with the same material as the bank 190, and the fourth sub-dam SDAM4 may be simultaneously formed with the same material as the spacer.

The antenna electrode AE may include a first antenna electrode layer AEL1 to an eighth antenna electrode layer AEL8. However, one or more embodiments are not necessarily limited thereto, and the antenna electrode AE may also include fewer than eight layers.

The first antenna electrode layer AEL1 may be simultaneously formed with the same material as the gate electrode TG of the thin-film transistor TFT and the first capacitor CAE1. A second antenna electrode layer AEL2 may be disposed on an exposed portion of the first antenna electrode layer AEL1, which is not covered by the first interlayer insulating layer 141. The second antenna electrode layer AEL2 may be simultaneously formed with the same material as the second capacitor electrode CAE2. A third antenna electrode layer AEL3 may be disposed on an exposed portion of the second antenna electrode layer AEL2, which is not covered by the second interlayer insulating layer 142. The third antenna electrode layer AEL3 may be simultaneously formed with the same material as the first connection electrode CE1. A fourth antenna electrode layer AEL4 may be disposed on the third antenna electrode layer AEL3. The fourth antenna electrode layer AEL4 may be simultaneously formed with the same material as the second connection electrode CE2.

A fifth antenna electrode layer AEL5 may be disposed on the fourth antenna electrode layer AEL4. The fifth antenna electrode layer AEL5 may be simultaneously formed with the same material as the pixel electrode 171. A sixth antenna electrode layer AEL6 may be disposed on the fifth antenna electrode layer AEL5. The sixth antenna electrode layer AEL6 may be simultaneously formed with the same material as the common electrode 173. A seventh antenna electrode layer AEL7 may be disposed on the sixth antenna electrode layer AEL6. The seventh antenna electrode layer AEL7 may be simultaneously formed with the same material as the first connector BE1 of the sensor electrode layer SENL. The eighth antenna electrode layer AEL8 may be disposed on the seventh antenna electrode layer AEL7. The eighth antenna electrode layer AEL8 may be simultaneously formed with the same material as the driving electrode TE, the sensing electrode RE, and the dummy electrode DE of the sensor electrode layer SENL.

The feed line AL may include a first feed line layer ALL1 to an eighth feed line layer ALL8. However, one or more embodiments are not necessarily limited thereto, and the feed line AL may also include fewer than eight layers.

Each of the first feed line layer ALL1 to the eighth feed line layer ALL8 may be simultaneously formed with the same material as a corresponding one of the first antenna electrode layer AEL1 to the eighth antenna electrode layer AEL8. For example, a structure of the first feed line layer ALL1 to the eighth feed line layer ALL8 may be substantially the same as a structure of the first antenna electrode layer AEL1 to the eighth antenna electrode layer AEL8. Therefore, to the extent that an element is not described in detail with respect to this figure, it may be understood that the element is at least similar to a corresponding element that has been described elsewhere within the present disclosure.

As shown in FIG. 11, each of the first ground electrode GND1 and the second ground electrode GND2 may include a first ground electrode layer GNL1 to an eighth ground electrode layer GNL8. However, one or more embodiments are not necessarily limited thereto, and each of the first ground electrode GND1 and the second ground electrode GND2 may also include fewer than eight layers.

The first ground electrode layer GNL1 may be simultaneously formed with the same material as the gate electrode TG of the thin-film transistor TFT and the first capacitor CAEL. A second ground electrode layer GNL2 may be disposed on an exposed portion of the first ground electrode layer GNL1, which is not covered by the first interlayer insulating layer 141. The second ground electrode layer GNL2 may be simultaneously formed with the same material as the second capacitor electrode CAE2. A third ground electrode layer GNL3 may be disposed on an exposed portion of the second ground electrode layer GNL2, which is not covered by the second interlayer insulating layer 142. The third ground electrode layer GNL3 may be simultaneously formed with the same material as the first connection electrode CE1. A fourth ground electrode layer GNL4 may be disposed on the third ground electrode layer GNL3. The fourth ground electrode layer GNL4 may be simultaneously formed with the same material as the second connection electrode CE2.

A fifth ground electrode layer GNL5 may be disposed on the fourth ground electrode layer GNL4. The fifth ground electrode layer GNL5 may be simultaneously formed with the same material as the pixel electrode 171. A sixth ground electrode layer GNL6 may be disposed on the fifth ground electrode layer GNL5. The sixth ground electrode layer GNL6 may be simultaneously formed with the same material as the common electrode 173. A seventh ground electrode layer GNL7 may be disposed on the sixth ground electrode layer GNL6. The seventh ground electrode layer GNL7 may be simultaneously formed with the same material as the first connector BE1 of the sensor electrode layer SENL. The eighth ground electrode layer GNL8 may be disposed on the seventh ground electrode layer GNL7. The eighth ground electrode layer GNL8 may be simultaneously formed with the same material as the driving electrode TE, the sensing electrode RE, and the dummy electrode DE of the sensor electrode layer SENL.

Each of the first antenna pad APD1 shown in FIG. 10 and the second antenna pad APD2 and the third antenna pad APD3 shown in FIG. 11 may include a first pad electrode layer PDL1 to an eighth pad electrode layer PDL8. However, one or more embodiments are not necessarily limited thereto, and each of the first antenna pad APD1, the second antenna pad APD2, and the third antenna pad APD3 may also include fewer than eight layers.

The first pad electrode layer PDL1 may be simultaneously formed with the same material as the gate electrode TG of the thin-film transistor TFT, the first capacitor CAE1, the first antenna electrode layer AEL1, and the first ground electrode layer GNL1. A second pad electrode layer PDL2 may be disposed on an exposed portion of the first pad electrode layer PDL1, which is not covered by the first interlayer insulating layer 141. The second pad electrode layer PDL2 may be simultaneously formed with the same material as the second capacitor electrode CAE2, the second antenna electrode layer AEL2, and the second ground electrode layer GNL2. A third pad electrode layer PDL3 may be disposed on an exposed portion of the second pad electrode layer PDL2, which is not covered by the second interlayer insulating layer 142. The third pad electrode layer PDL3 may be simultaneously formed with the same material as the first connection electrode CE1, the third antenna electrode layer AEL3, and the third ground electrode layer GNL3. A fourth pad electrode layer PDL4 may be disposed on the third pad electrode layer PDL3.

The fourth pad electrode layer PDL4 may be simultaneously formed with the same material as the second connection electrode CE2, the fourth antenna electrode layer AEL4, and the fourth ground electrode layer GNL4. A fifth pad electrode layer PDL5 may be disposed on the fourth pad electrode layer PDL4. The fifth pad electrode layer PDL5 may be simultaneously formed with the same material as the pixel electrode 171, the fifth antenna electrode layer AEL5, and the fifth ground electrode layer GNL5. A sixth pad electrode layer PDL6 may be disposed on the fifth pad electrode layer PDL5. The sixth pad electrode layer PDL6 may be simultaneously formed with the same material as the common electrode 173, the sixth antenna electrode layer AEL6, and the sixth ground electrode layer GNL6. A seventh pad electrode layer PDL7 may be disposed on the sixth pad electrode layer PDL6. The seventh pad electrode layer PDL7 may be simultaneously formed with the same material as the first connector BE1 of the sensor electrode layer SENL, the seventh antenna electrode layer AEL7, and the seventh ground electrode layer GNL7. The eighth pad electrode layer PDL8 may be disposed on the seventh pad electrode layer PDL7. The eighth pad electrode layer PDL8 may be simultaneously formed with the same material as the driving electrode TE, the sensing electrode RE, the dummy electrode DE, the eighth antenna electrode layer AEL8, and the eighth ground electrode layer GNL8.

As described above, the third ground electrode GND3 may be disposed on the lower surface of the first substrate SUB1 of the substrate SUB. As described above, the first antenna area AA1 is bent, and at least a portion of the first antenna area AA1 may be arranged under the display area DA, and thus, the support substrate SSUB of the substrate SUB may be removed from the first antenna area AA1.

The third ground electrode GND3 may be simultaneously formed with the same material as the heat dissipation layer HSL of the panel lower cover PB. A thickness of the third ground electrode GND3 may be greater than a thickness of the antenna electrode AE, a thickness of the feed line AL, a thickness of the first ground electrode GND1, a thickness of the second ground electrode GND2, a thickness of the first antenna pad APD1, a thickness of the second antenna pad APD2, and a thickness of the third antenna pad APD3. Therefore, the thickness of the third ground electrode GND3 may be greater than a sum of thicknesses of the first antenna electrode layer AEL1 to the eighth antenna electrode layer AEL8 of the antenna electrode AE. Also, the thickness of the third ground electrode GND3 may be greater than a sum of thicknesses of the first feed line layer ALL1 to the eighth feed line layer ALL8 of the feed line AL. In addition, the thickness of the third ground electrode GND3 may be greater than a sum of thicknesses of the first ground electrode layer GNL1 to the eighth ground electrode layer GNL8 of each of the first ground electrode GND1 and the second ground electrode GND2. Also, the thickness of the third ground electrode GND3 may be greater than a sum of thicknesses of the first pad electrode layer PDL1 to the eighth pad electrode layer PDL8 of each of the first antenna pad APD1, the second antenna pad APD2, and the third antenna pad APD3.

Moreover, the thickness of the antenna electrode AE, the thickness of the feed line AL, the thickness of the first ground electrode GND1, the thickness of the second ground electrode GND2, the thickness of the first antenna pad APD1, the thickness of the second antenna pad APD2, and the thickness of the third antenna pad APD3 may be equal to each other.

As described above, the first antenna electrode layer AEL1 to the eighth antenna electrode layer AEL8 of the antenna electrode AE, the first feed line layer ALL1 to the eighth feed line layer ALL8 of the feed line AL, the first ground electrode layer GNL1 to the eighth ground electrode layer GNL8 of each of the first ground electrode GND1 and the second ground electrode GND2, and the first pad electrode layer PDL1 to the eighth pad electrode layer PDL8 of each of the first antenna pad APD1, the second antenna pad APD2, and the third antenna pad APD3 are simultaneously formed with the same material as the elements of the thin-film transistor layer TFTL, the light-emitting element layer EML, and the sensor electrode layer SENL. Accordingly, the antenna electrode AE, the feed line AL, the first ground electrode GND1, the second ground electrode GND2, the first antenna pad APD1, the second antenna pad APD2, and the third antenna pad APD3 may be formed without additional separate processes.

Similarly, the third ground electrode GND3 is simultaneously formed with the same material as the heat dissipation layer HSL of the panel lower cover PB, and accordingly, there is no need to add a separate process to form the third ground electrode GND3.

The first antenna AT1 arranged in the first antenna area AA1 of FIG. 1 has been described above with reference to FIGS. 7 to 11, and the description of the first antenna AT1 may also be applied to the second antenna AT2 arranged in the second antenna area AA2 of FIG. 1 as long as only coordinates axes in FIGS. 7, 8, and 10 are transformed. For example, except that the second antenna AT2 includes the plurality of antenna modules AM arranged in the second direction (y-axis direction) rather than the first direction (x-axis direction), the description of the first antenna AT1 provided above with reference to FIGS. 7 to 11 may also be applied to the second antenna AT2. Therefore, to the extent that an element is not described in detail with respect to this figure, it may be understood that the element is at least similar to a corresponding element that has been described elsewhere within the present disclosure.

Figure 12:
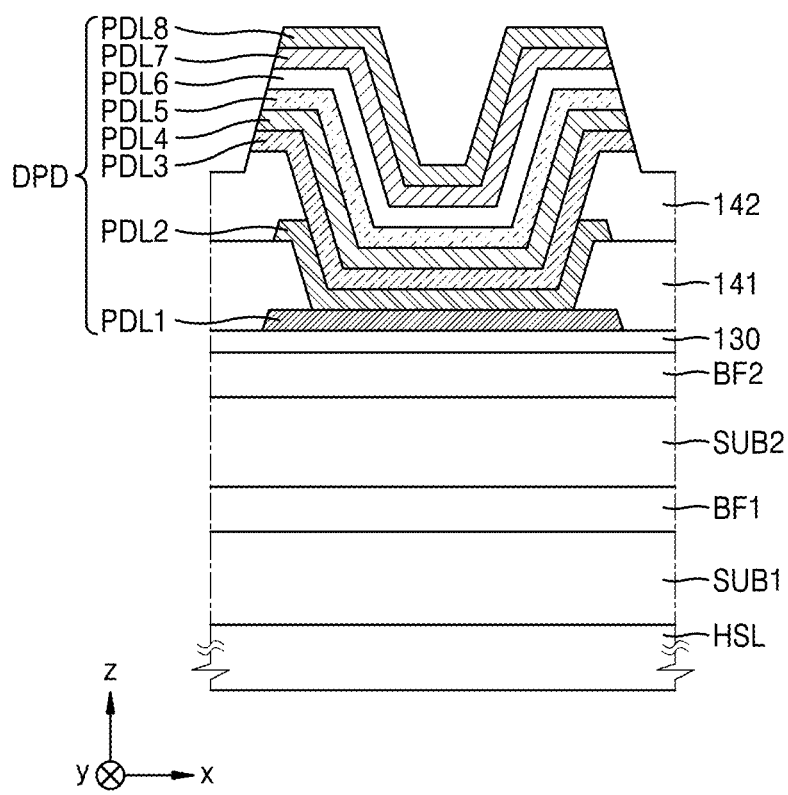
FIG. 12 is a schematic cross-sectional view illustrating a first pad of FIG. 1.

FIG. 12 is a schematic cross-sectional view illustrating a first pad of FIG. 1, i.e., a display pad DPD. As shown in FIG. 12, each display pad DPD may include a first pad electrode layer PDL1 to an eighth pad electrode layer PDL8. However, one or more embodiments are not necessarily limited thereto, and the display pads DPD may also include fewer than eight layers.

The first pad electrode layer PDL1 to the eighth pad electrode layer PDL8 of each of the display pads DPD are substantially the same as the first pad electrode layer PDL1 to the eighth pad electrode layer PDL8 of each of the first antenna pad APD1, the second antenna pad APD2, and the third antenna pad APD3, which are described above with reference to FIGS. 10 and 11. Therefore, to the extent that an element is not described in detail with respect to this figure, it may be understood that the element is at least similar to a corresponding element that has been described elsewhere within the present disclosure.

As described above, the antenna electrode AE, the feed line AL, the first ground electrode GND1, the second ground electrode GND2, the first antenna pad APD1, the second antenna pad APD2, and the third antenna pad APD3 are simultaneously formed with substantially the same material as the display pads DPD, and thus may be formed without additional separate processes.

Figure 13:
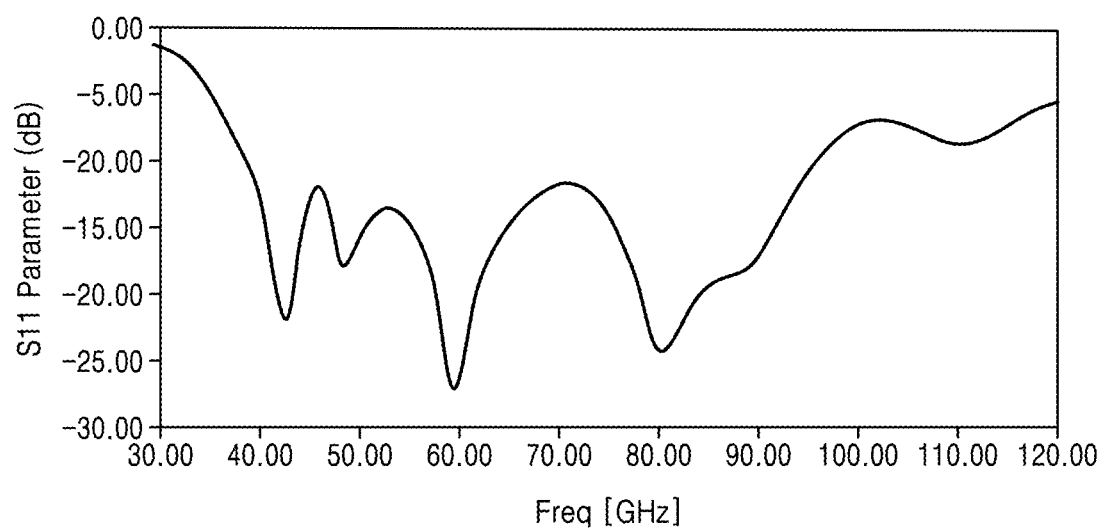
FIG. 13 is a graph showing a reflection coefficient according to frequency in an antenna module provided in a display apparatus, according to an embodiment.

FIG. 13 is a graph showing a reflection coefficient according to frequency in an antenna module AM provided in a display apparatus, according to an embodiment. In FIG. 13, a horizontal axis represents frequency (GHz), and a vertical axis represents an S11 parameter, which is a ratio of the magnitude of a reflected signal to the magnitude of an input signal. The S11 parameter is a reflection coefficient of the antenna module AM and may have a unit of decibels (dB).

When an operation of the antenna module AM is determined, the determination may be made based on a case in which the S11 parameter has a negative value. When the S11 parameter has a negative value, it may mean that the magnitude of the reflected signal is less than the magnitude of the input signal. As the S11 parameter has a smaller value, the magnitude of a signal that returns after being reflected may decrease. As the magnitude of the reflected signal is smaller, it may be determined that the antenna module AM operates in a corresponding frequency band.

As seen in FIG. 13, the antenna module AM that may be included in the display apparatus 10 according to an embodiment has a minimum value of -27 dB at about 59 GHz. Therefore, the antenna module AM according to an embodiment may optimally operate at 59 GHz.

As seen in FIG. 13, a frequency band in which an S11 value of the antenna module AM is −10 dB or less is about 39 GHz to about 96 GHz, and thus, a −10 dB impedance bandwidth of the antenna module AM may be about 57 GHz. For example, the antenna module AM built into the display panel 300 has a fairly wide bandwidth.

Figure 14:
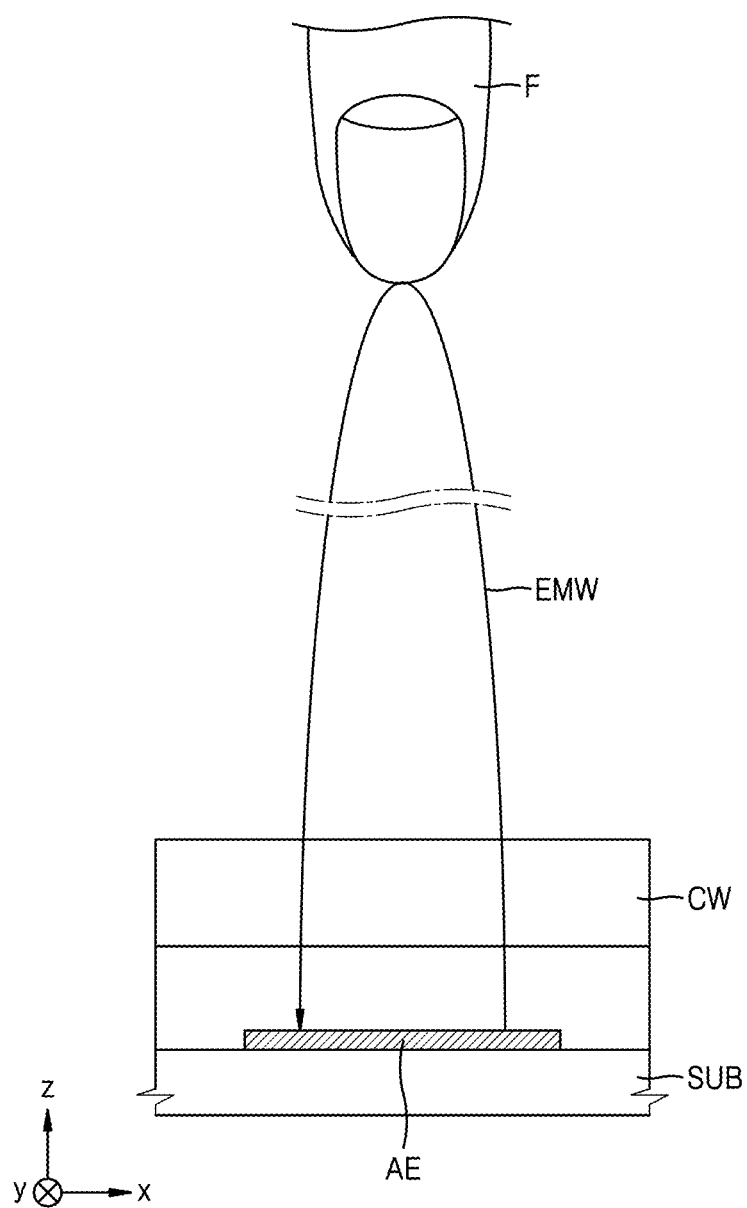
FIG. 14 is a conceptual diagram showing detection of a nearby object using antenna in a display apparatus, according to an embodiment.

FIG. 14 is a conceptual diagram showing detection of a nearby object using antenna in a display apparatus 10, according to an embodiment. The antenna driving circuit 360 (see FIG. 4) outputs a transmission signal with a certain frequency to the antenna electrode AE through the feed line AL during a first period. The certain frequency may be about 57.9 GHz to about 68.9 GHz, for example, 61.5 GHz. The antenna electrode AE may radiate electromagnetic waves EMW according to the transmission signal during the first period. In order for the antenna electrode AE to transmit or receive electromagnetic waves EMW of about 57.9 GHz to about 68.9 GHZ (e.g., millimeter wave (mmWave)), when the first antenna area AA1 protrudes in the second direction (y-axis direction) from the upper side of the display area DA as shown in FIG. 1, the length of the antenna electrode AE in the first direction (x-axis direction) may be about 2 mm.

The electromagnetic waves EMW radiated from the antenna electrode AE may be reflected from an object such as a finger F or a pen located within about 1 m from the cover window CW. The antenna driving circuit 360 may receive a reception signal received by the antenna electrode AE according to the electromagnetic waves EMW reflected from the object, such as the finger F or the pen, during a second period. For example, the antenna electrode AE may time-dividedly driven to serve as a transmission electrode during the first period and as a reception electrode during the second period.

As shown in FIG. 14, by transmitting or receiving the electromagnetic waves EMW having an ultra-high frequency (e.g., mmWave) using the antenna electrode AE, a proximity touch such as gesture may be detected.

As shown in FIG. 1, the display apparatus according to the present embodiment may have a shape in which the first antenna area AA1 is located on the upper side (in the +y direction) of the display area DA and extends in the first direction (x-axis direction). Accordingly, the first antenna AT1 arranged in the first antenna area AA1 belonging to the peripheral area NDA may also be located on the upper side (in the +y direction) of the display area DA and may extend in the first direction (x-axis direction). For example, as described above with reference to FIG. 7, the first antenna AT1 may include the plurality of antenna modules AM arranged in the first direction (x-axis direction). Accordingly, the first antenna AT1 may sensitively and accurately detect a gesture moving in the first direction (x-axis direction).

Moreover, as shown in FIG. 1, the display apparatus 10, according to the present embodiment, may have a shape in which the second antenna area AA2 is located on the side (in the −x direction) of the display area DA and extends in the second direction (y-axis direction). Accordingly, the second antenna AT2 arranged in the second antenna area AA2 belonging to the peripheral area NDA may also be located on the side (in the −x direction) of the display area DA and may extend in the second direction (y-axis direction). The second antenna AT2 may include the plurality of antenna modules AM arranged in the second direction (y-axis direction). Accordingly, the second antenna AT2 may sensitively and accurately detect a gesture moving in the second direction (y-axis direction).

As described above, the display apparatus 10, according to the present embodiment, includes the first antenna AT1 extending in the first direction (x-axis direction) and the second antenna AT2 extending in the second direction (y-axis direction), and thus may accurately detect movement or gestures in which movement in the first direction (x-axis direction) and movement in the second direction (y-axis direction) are combined. For example, the display apparatus 10, according to the present embodiment, may even accurately detect sign language where even small changes in movement mean different content. For example, the display apparatus 10, according to the present embodiment, may accurately detect hand movement based on sign language motions by using the first antenna AT1 and the second antenna AT2. In addition, by using the plurality of pixels arranged in the display area DA, text corresponding to the detected movement, for example, text corresponding to the detected sign language, may be displayed.

Moreover, as described above, the display apparatus 10, according to the present embodiment, may include the data driving circuit 320 that outputs data signals to be transferred to the plurality of pixels arranged in the display area DA. The data driving circuit 320 may be an IC, and as shown in FIGS. 1, 3, and 4, the data driving circuit 320 may be arranged in the peripheral area NDA and located under the display area DA with respect to the display area DA.

The display pads DPD, which may be referred to as first pads, may be arranged on one edge of the sub-area SBA belonging to the peripheral area NDA. The display pads DPD may be electrically connected to the data driving circuit 320 via lines arranged on the substrate. The plurality of first antenna pads APD1 electrically connected to the first antenna AT1 via lines may be arranged on one edge of the first antenna area AA1 belonging to the peripheral area NDA. Similarly, the plurality of second antenna pads APD2 electrically connected to the second antenna AT2 via lines may be arranged on one edge of the second antenna area AA2 belonging to the peripheral area NDA. When a location where the display pads DPD are located referred to as a first portion of the peripheral area NDA, a location where the first antenna pads APD1 are located may be referred to as a second portion of the peripheral area NDA, and a location where the second antenna pads APD2 are located may be referred to as a third portion of the peripheral area NDA. As shown in FIG. 1, the second portion may be spaced apart from the first portion with respect to the display area DA. For example, the display area DA may be disposed between the first portion and the second portion.

As described above, the display PCB 310 may be electrically connected to the display pads DPD, the first antenna PCB 341 may be electrically connected to the first antenna pads APD1 of the first antenna area AA1, and the second antenna PCB 342 may be electrically connected to the second antenna pads APD2 of the second antenna area AA2.

As described above with reference to FIG. 4, the display PCB 310 may be electrically connected to the main circuit board 700 via the flexible circuit board 312, and the first antenna PCB 341 may also be electrically connected to the main circuit board 700. The second antenna PCB 342 may also be electrically connected to the main circuit board 700 in the same manner. The antenna driving circuit 360 is mounted on the main circuit board 700, and thus, the antenna driving circuit 360 may receive, as inputs, electromagnetic wave signals received by the antenna electrodes and process the electromagnetic wave signals.

For example, the display apparatus 10 according to the present embodiment may accurately detect hand movement based on sign language motions by using the first antenna AT1 and the second antenna AT2, and transmit corresponding data to the antenna driving circuit 360, and the antenna driving circuit 360 may analyze the data and derive text corresponding to the detected movement. This may be achieved using a motion-to-text (MTT) algorithm, for example, one using artificial intelligence. The antenna driving circuit 360 may transmit, to the main processor 710 mounted on the main circuit board 700, information regarding the text derived as described above, and the main processor 710 may transmit received data to the data driving circuit 320 such that text corresponding to the sign language is displayed in the display area DA. An object for which the display apparatus 10, according to the present embodiment, detects and displays corresponding text is not necessarily limited to sign language, and various gestures may be similarly processed. In addition, the main processor 710, rather than the antenna driving circuit 360, may analyze the data and derive text corresponding to the detected movement. This applies to the following embodiments and modifications thereof.

Figure 15:
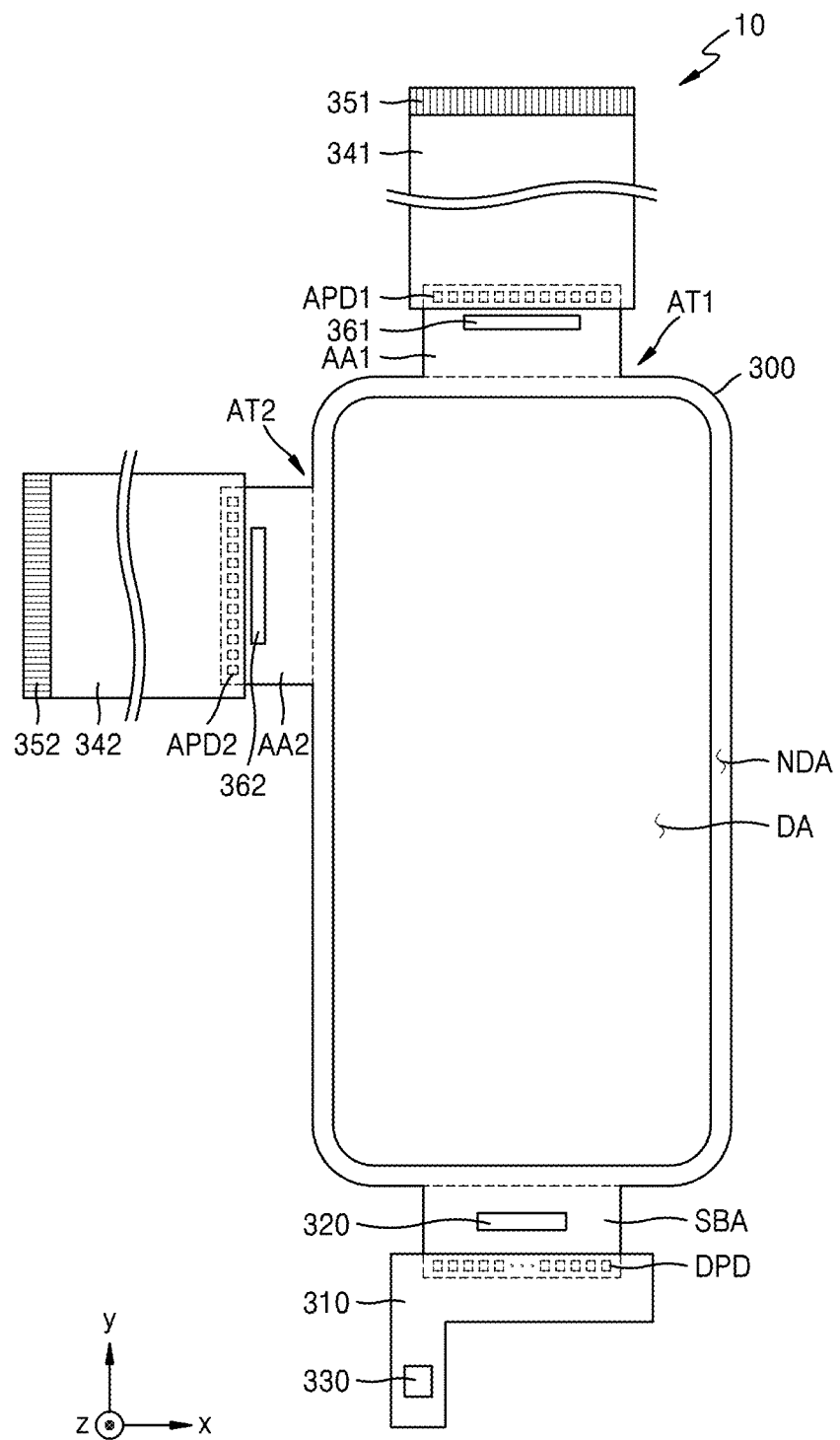
FIG. 15 is a schematic plan view illustrating a portion of a display apparatus according to an embodiment.

A case in which the antenna driving circuit 360 is mounted on the main circuit board 700 has been described above, but one or more embodiments are not necessarily limited thereto. As shown in FIG. 15, which is a schematic plan view illustrating a portion of a display apparatus 10 according to an embodiment, a first antenna driving circuit 361 may be mounted in the first antenna area AA1, and a second antenna driving circuit 362 may be mounted in the second antenna area AA2. This may be understood as being similar to the data driving circuit 320 being disposed on the sub-area SBA of the display panel 300.

In this case, data regarding hand movement based on sign language motions detected through the first antenna AT1 may be transmitted to the first antenna driving circuit 361, and the first antenna driving circuit 361 may analyze the data and transmit, through the first antenna PCB 341, an analysis result to the main processor 710 mounted on the main circuit board 700. Similarly, data regarding hand movement based on sign language motions detected through the second antenna AT2 may be transmitted to the second antenna driving circuit 362, and the second antenna driving circuit 362 may analyze the data and transmit, through the second antenna PCB 342, an analysis result to the main processor 710 mounted on the main circuit board 700. The main processor 710 may derive text corresponding to the detected movement from the received data, and may transmit the text to the data driving circuit 320 such that the text corresponding to the sign language is displayed in the display area DA. The object for which the display apparatus 10 according to the present embodiment detects and displays corresponding text is not necessarily limited to sign language, and various gestures may be similarly processed.

Figure 16:
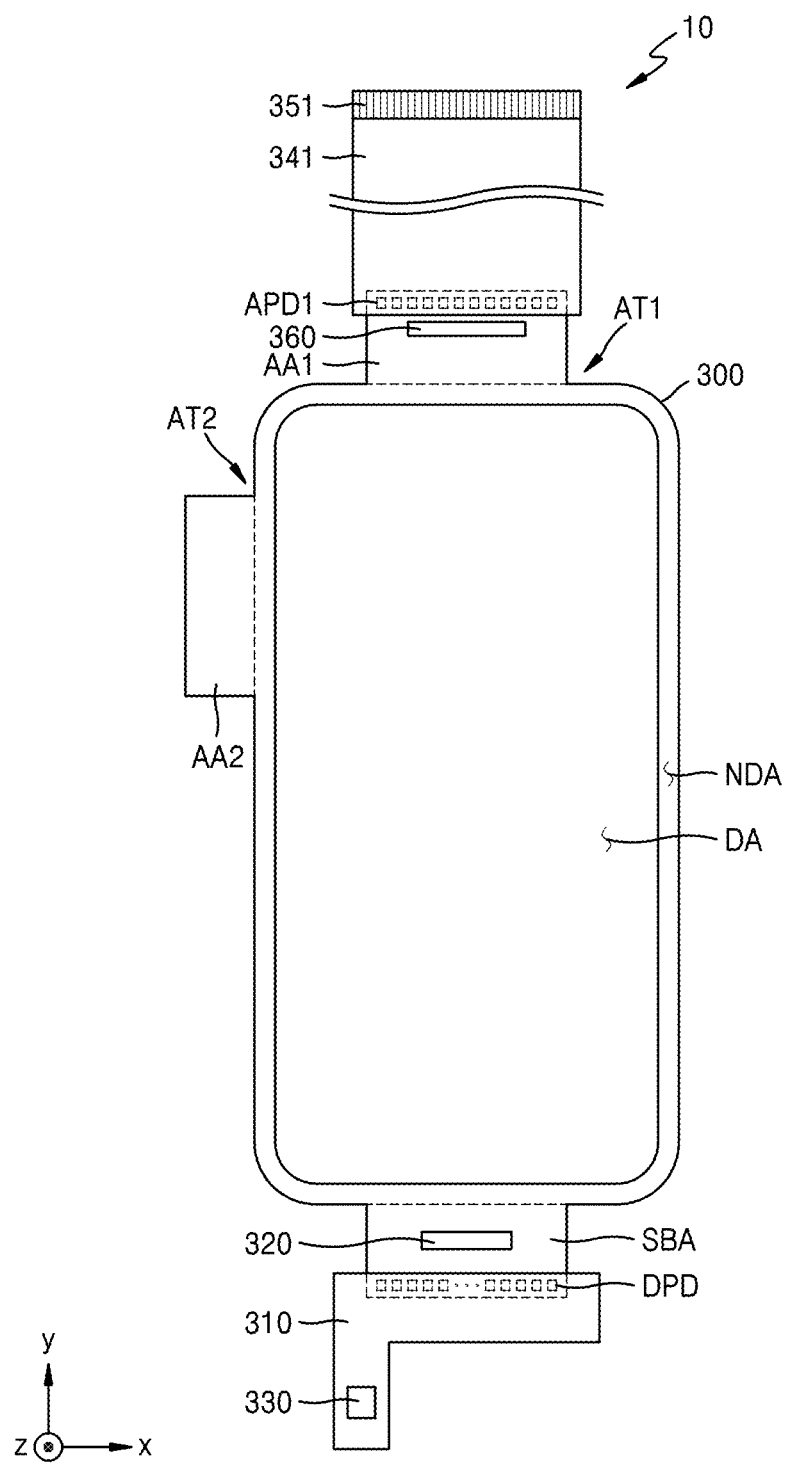
FIG. 16 is a schematic plan view illustrating a portion of a display apparatus according to an embodiment.

FIG. 15 shows that the display apparatus 10 includes the first antenna driving circuit 361 and the second antenna driving circuit 362, but the display apparatus 10, according to the present embodiment, is not necessarily limited thereto. For example, as shown in FIG. 16, which is a schematic plan view illustrating a portion of a display apparatus 10, according to an embodiment, the antenna driving circuit 360 may also be mounted in one of the first antenna area AA1 and the second antenna area AA2. FIG. 16 shows that the antenna driving circuit 360 is mounted in the first antenna area AA1.

In this case, data regarding hand movement based on sign language motions detected through the second antenna AT2 of the second antenna area AA2 is transmitted, through a line arranged in the peripheral area NDA, to the antenna driving circuit 360 arranged in the first antenna area AA1. Data regarding hand movement based on sign language motions detected through the first antenna AT1 is also transmitted to the antenna driving circuit 360. The antenna driving circuit 360 may analyze the data and derive text corresponding to the detected movement. The antenna driving circuit 360 may transmit information regarding the text derived as described above, to the main processor 710 mounted on the main circuit board 700, through the first antenna PCB 341. The main processor 710 may transmit received data to the data driving circuit 320 such that text corresponding to the sign language is displayed in the display area DA. The object for which the display apparatus 10 according to the present embodiment detects and displays corresponding text is not necessarily limited to sign language, and various gestures may be similarly processed.

As shown in FIG. 16, the display apparatus 10, according to the present embodiment, might not include the second antenna pad APD2, the second antenna PCB 342, and the second connector 352. This is because data obtained by the second antenna AT2 of the second antenna area AA2 may also be processed or transmitted through the first antenna pad APD1, the first antenna PCB 341, and the first connector 351.

As described above, when a location where the display pads DPD are located and the vicinity thereof are referred to as a first portion of the peripheral area NDA, a location where the first antenna pads APD1 are located and the vicinity thereof may be referred to as a second portion of the peripheral area NDA. The second portion may be spaced apart from the first portion with respect to the display area DA. For example, the display area DA may be between the first portion and the second portion. In this case, the data driving circuit 320 may be arranged in the first portion, and the antenna driving circuit 360 may be arranged in the second portion.

Figure 17:
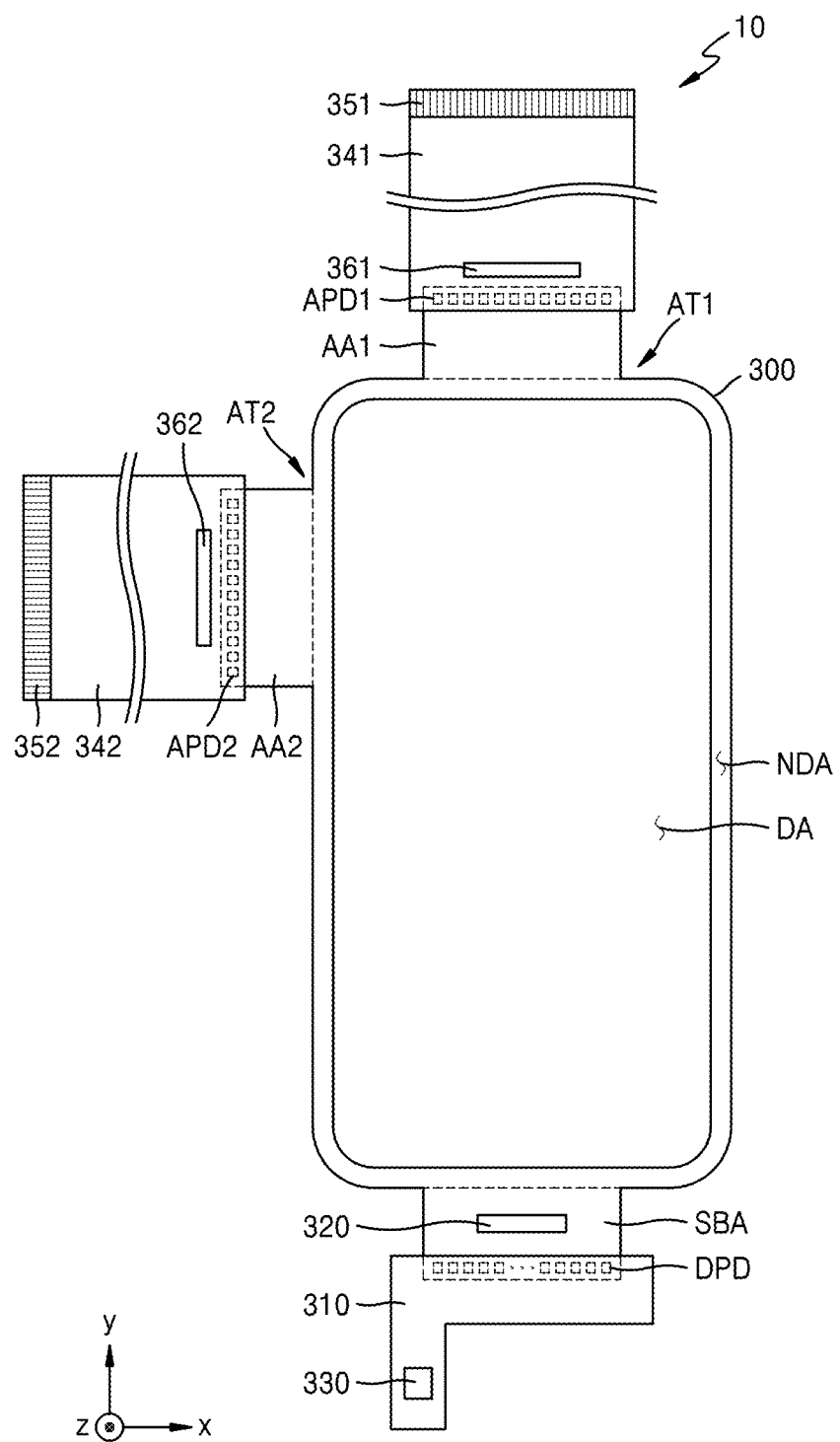
FIG. 17 is a schematic plan view illustrating a portion of a display apparatus according to an embodiment.

In addition, as shown in FIG. 17, which is a schematic plan view illustrating a portion of a display apparatus 10 according to an embodiment, the first antenna driving circuit 361 may be mounted on the first antenna PCB 341 attached to the first antenna pads APD1 of the first antenna area AA1, and the second antenna driving circuit 362 may be mounted on the second antenna PCB 342 attached to the second antenna pads APD2 of the second antenna area AA2.

In this case, data regarding hand movement based on sign language motions detected through the first antenna AT1 may be transmitted to the first antenna driving circuit 361 on the first antenna PCB 341 through the first antenna pad APD1, and the first antenna driving circuit 361 may analyze the data and transmit, through the first antenna PCB 341, an analysis result to the main processor 710 mounted on the main circuit board 700. Similarly, data regarding hand movement based on sign language motions detected through the second antenna AT2 may be transmitted to the second antenna driving circuit 362 on the second antenna PCB 342 through the second antenna pad APD2, and the second antenna driving circuit 362 may analyze the data and transmit, through the second antenna PCB 342, an analysis result to the main processor 710 mounted on the main circuit board 700. The main processor 710 may derive text corresponding to the detected movement from the received data, and may transmit the text to the data driving circuit 320 such that the text corresponding to the sign language is displayed in the display area DA. The object for which the display apparatus 10 according to the present embodiment detects and displays corresponding text is not necessarily limited to sign language, and various gestures may be similarly processed.

Figure 18:
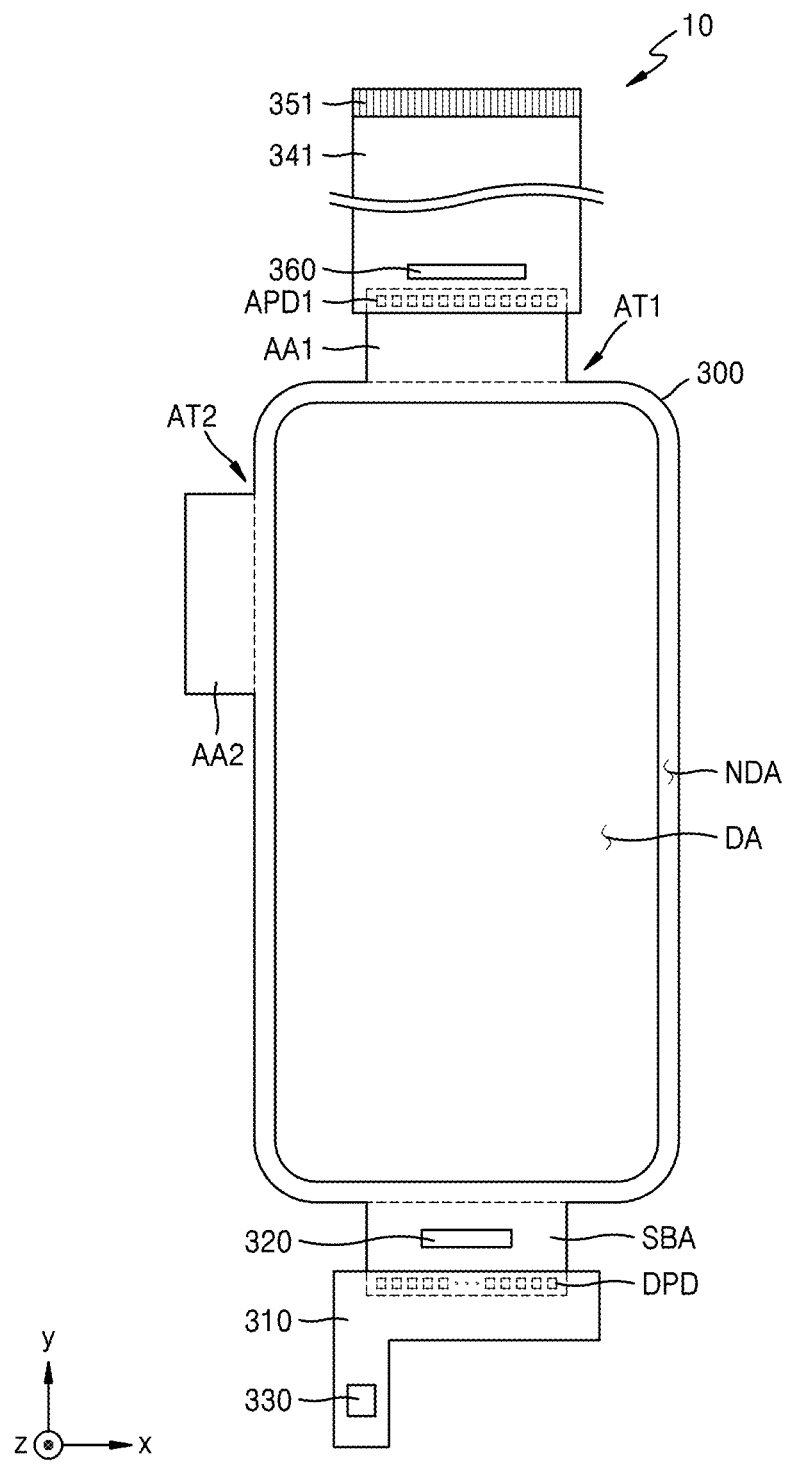
FIG. 18 is a schematic plan view illustrating a portion of a display apparatus according to an embodiment.

FIG. 17 shows that the display apparatus 10 includes the first antenna driving circuit 361 and the second antenna driving circuit 362, but the display apparatus 10 according to the present embodiment is not necessarily limited thereto. For example, as shown in FIG. 18, which is a schematic plan view illustrating a portion of a display apparatus 10 according to an embodiment, the antenna driving circuit 360 may also be mounted on one of the first antenna PCB 341 and the second antenna PCB 342. FIG. 18 shows that the antenna driving circuit 360 is mounted on the first antenna PCB 341.

In this case, data regarding hand movement based on sign language motions detected through the second antenna AT2 of the second antenna area AA2 is transferred to the antenna driving circuit 360 mounted on the first antenna PCB 341, through a line arranged in the peripheral area NDA and through the first antenna pad APD1 arranged in the first antenna area AA1. Data regarding hand movement based on sign language motions detected through the first antenna AT1 is also transmitted to the antenna driving circuit 360. The antenna driving circuit 360 may analyze the data and derive text corresponding to the detected movement. The antenna driving circuit 360 may transmit information regarding the text derived as described above, to the main processor 710 mounted on the main circuit board 700, through the first antenna PCB 341. The main processor 710 may transmit received data to the data driving circuit 320 such that text corresponding to the sign language is displayed in the display area DA. The object for which the display apparatus 10 according to the present embodiment detects and displays corresponding text is not necessarily limited to sign language, and various gestures may be similarly processed.

As shown in FIG. 18, the display apparatus 10, according to the present embodiment, might not include the second antenna pad APD2, the second antenna PCB 342, and the second connector 352. This is because data obtained by the second antenna AT2 of the second antenna area AA2 may also be processed or transmitted through the first antenna pad APD1, the first antenna PCB 341, and the first connector 351.

Moreover, FIGS. 16 and 18 show that the second antenna area AA2 protrudes (in the −x direction) even though the second antenna PCB 342 is not present, but one or more embodiments are not necessarily limited thereto. For example, the second antenna area AA2 does not protrude (in the −x direction), and accordingly, the peripheral area NDA at least partially surrounding the display area DA may have a smooth shape without any protruding portions, except for a portion where the first antenna area AA1 exists.

Those of ordinary skill in the art will understand that various modifications and equivalent embodiments may be made from the embodiments disclosed herein.

According to the one or more embodiments as described above, a display apparatus capable of detecting movement of an object and displaying text corresponding to the detected movement may be implemented. However, the scope of the disclosure is not necessarily limited by the above effects.

What is claimed is:
1. A display apparatus, comprising:
   a substrate including a display area and a peripheral area proximate to the display area;
   a plurality of pixels arranged in the display area;
   a first motion detection antenna disposed in the peripheral area and extending in a first direction; and
   a second motion detection antenna disposed in the peripheral area and extending in a second direction crossing the first direction,
   wherein the second motion detection antenna is disposed on a side of the display area that is adjacent to a side of the display area that the first motion detection antenna is disposed on, and
   wherein both the first motion detection antenna and the second motion detection antenna are separated from the display area by a dam.
2. The display apparatus of claim 1, further comprising a data driving circuit disposed in the peripheral area and configured to output data signals to the plurality of pixels.

3. The display apparatus of claim 2, further comprising an antenna driving circuit disposed in the peripheral area, the antenna driving circuit configured to:
- transmit, to the first motion detection antenna and the second motion detection antenna, signals regarding electromagnetic waves to be radiated from the first motion detection antenna and the second motion detection antenna, or
- process electromagnetic signals received by the first motion detection antenna and the second motion detection antenna.

4. The display apparatus of claim 3, wherein the data driving circuit is disposed in a first portion of the peripheral area, and the antenna driving circuit is disposed in a second portion of the peripheral area.

5. The display apparatus of claim 4, wherein the display area is disposed between the first portion and the second portion.

6. The display apparatus of claim 2, further comprising:
- a plurality of first pads disposed in a first portion of the peripheral area and electrically connected to the data driving circuit; and
- a plurality of second pads disposed in a second portion of the peripheral area and electrically connected to the first motion detection antenna or the second motion detection antenna.

7. The display apparatus of claim 6, wherein the display area is disposed between the first portion and the second portion.

8. The display apparatus of claim 6, further comprising:
- a display printed circuit board electrically connected to the plurality of first pads; and
- an antenna printed circuit board electrically connected to the plurality of second pads.

9. The display apparatus of claim 8, further comprising an antenna driving circuit disposed on the antenna printed circuit board, the antenna driving circuit configured to:
- transmit, to the first motion detection antenna and the second motion detection antenna, signals regarding electromagnetic waves to be radiated from the first motion detection antenna and the second motion detection antenna, or
- process electromagnetic signals received by the first motion detection antenna and the second motion detection antenna.

10. The display apparatus of claim 8, further comprising a main circuit board electrically connected to the display printed circuit board and the antenna printed circuit board.

11. The display apparatus of claim 10, further comprising an antenna driving circuit disposed on the main circuit board, the antenna driving circuit configured to:
- transmit, to the first motion detection antenna and the second motion detection antenna, signals regarding electromagnetic waves to be radiated from the first motion detection antenna and the second motion detection antenna, or
- process electromagnetic signals received by the first motion detection antenna and the second motion detection antenna.

12. The display apparatus of claim 1, wherein the first motion detection antenna and the second motion detection antenna are disposed between the dam and an edge of the substrate.

13. The display apparatus of claim 1, wherein the display apparatus is configured to detect a movement of an object through the first motion detection antenna and the second motion detection antenna and is further configured to display text corresponding to the detected movement of the object through the plurality of pixels.

14. The display apparatus of claim 13, wherein the movement of the object is a hand movement conforming to a sign language.

15. An electronic device, comprising:
- a display area including a pair of first sides extending in a first direction and a pair of second sides extending in a second direction crossing the first direction;
- a non-display area at least partially surrounding the display area and including a pair of first sides extending in the first direction and corresponding to the pair of first sides of the display area, and a pair of second sides extending in the second direction and corresponding to the pair of second sides of the display area;
- a first motion detection antenna extending in the second direction from one of the first sides of the pair of first sides of the non-display area; and
- a second motion detection antenna extending in the first direction from one of the second sides of the pair of second sides of the non-display area,
- wherein each of the first motion detection antenna and the second motion detection antenna are configured to detect movement of an object proximate to the display apparatus and communicate the detected movement to a driving circuit that is configured to interpret the movement into text, and
- wherein both the first motion detection antenna and the second motion detection antenna are separated from the display area by a dam.

16. The electronic device of claim 15, wherein the driving circuit is disposed in the non-display area.

17. The electronic device of claim 15, further comprising:
- a plurality of first pads disposed in the non-display area and electrically connected to the driving circuit; and
- a plurality of second pads disposed in the non-display area and electrically connected to the first and/or the second motion detection antennas.

18. The electronic device of claim 17, further comprising:
- a display printed circuit board electrically connected to the plurality of first pads; and
- an antenna printed circuit board electrically connected to the plurality of second pads.

19. The electronic device of claim 15, wherein the display area is configured to display the text interpreted by the driving circuit.

20. The electronic device of claim 15, wherein the driving circuit is configured to interpret movement that conforms to a sign language hand gesture.

* * * * *